(12) United States Patent  (10) Patent No.: US 6,642,960 B1
Kohashi et al.  (45) Date of Patent: Nov. 4, 2003

(54) IMAGE PICKUP APPARATUS

(75) Inventors: Atsushi Kohashi, Hachioji (JP); Dai Kawase, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/241,086

(22) Filed: Feb. 1, 1999

(30) Foreign Application Priority Data

Feb. 2, 1998 (JP) .......................................... 10-033571

(51) Int. Cl.[7] .............................. H04N 9/64; H04N 3/14; G06K 9/38
(52) U.S. Cl. ...................... 348/246; 348/247; 348/273; 382/272
(58) Field of Search ................................ 348/246, 247, 348/273; 382/272, 275, 205

(56) References Cited

U.S. PATENT DOCUMENTS

| | | | | |
|---|---|---|---|---|
| 5,327,246 A | * | 7/1994 | Suzuki ........................ | 348/246 |
| 5,392,070 A | * | 2/1995 | Endo et al. .................. | 348/247 |
| 5,696,554 A | * | 12/1997 | Hwang ........................ | 348/246 |
| 5,805,216 A | * | 9/1998 | Tabei et al. ................. | 348/246 |
| 5,982,946 A | * | 11/1999 | Murakami ................... | 382/272 |
| 6,076,465 A | * | 6/2000 | Vacca et al. ................. | 101/481 |
| 6,360,005 B1 | * | 3/2002 | Aloni et al. ................. | 382/148 |

* cited by examiner

*Primary Examiner*—Wendy R. Garber
*Assistant Examiner*—Lin Ye
(74) *Attorney, Agent, or Firm*—Armstrong, Westerman & Hattori, LLP

(57) ABSTRACT

An image pickup apparatus capable of compensating fault pixels at high accuracy with considering the image configuration in a region surrounding the fault pixels, constructed as including: a CCD image pickup device having two-dimensionally arrayed pixels; a fault pixel information storage means for storing the position of fault pixels of the image pickup device and, if the fault pixels are two-dimensionally consecutive, a pattern of their order; and a pixel defect compensation processing section for detecting an image configuration of a region surrounding a fault pixel location in image pickup signal from pixel information in the surrounding of the fault pixels, selecting based on the detected image configuration pixels by which the fault pixel should be interpolated, and compensating the fault pixels based on interpolation by the selected pixels.

4 Claims, 23 Drawing Sheets

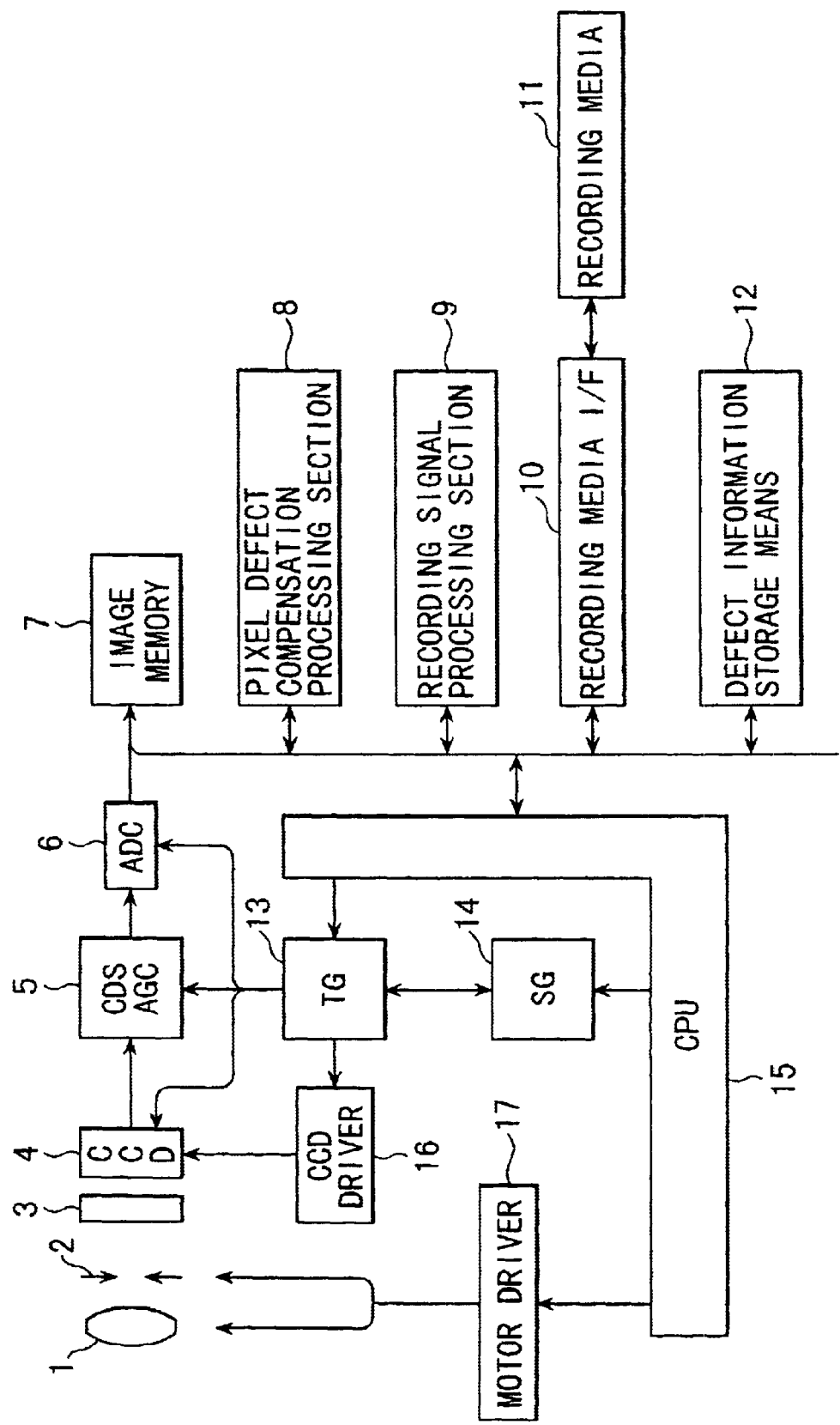

35: FAULT PIXEL

PATTERN 1 (-9)
PATTERN 2 (-6)
PATTERN 3 (-7)

PATTERN 4 (-8)
PATTERN 5 (-5)
PATTERN 6 (-2)

PATTERN 7 (-3)
PATTERN 8 (-4)
PATTERN 9 (-1)

FIG. 12A

| P00 | P01 | P02 | P03 | P04 | P05 | P06 |
|---|---|---|---|---|---|---|
| P10 | *P11* | P12 | *P13* | P14 | *P15* | P16 |
| P20 | P21 | P22 | P23 | P24 | P25 | P26 |
| P30 | *P31* | P32 | P33 | P34 | *P35* | P36 |
| P40 | P41 | P42 | P43 | P44 | P45 | P46 |
| P50 | *P51* | P52 | *P53* | P54 | *P55* | P56 |
| P60 | P61 | P62 | P63 | P64 | P65 | P66 |

FIG. 12B

| P00 | P01 | P02 | P03 | P04 | P05 | P06 |
|---|---|---|---|---|---|---|
| P10 | P11 | *P12* | P13 | *P14* | P15 | *P16* |
| P20 | P21 | P22 | P23 | P24 | P25 | P26 |
| P30 | P31 | *P32* | P33 | P34 | P35 | *P36* |
| P40 | P41 | P42 | P43 | P44 | P45 | P46 |
| P50 | P51 | *P52* | P53 | *P54* | P55 | *P56* |
| P60 | P61 | P62 | P63 | P64 | P65 | P66 |

FIG. 12C

| P00 | P01 | P02 | P03 | P04 | P05 | P06 |
|---|---|---|---|---|---|---|
| P10 | P11 | P12 | P13 | P14 | P15 | P16 |
| P20 | *P21* | P22 | *P23* | P24 | *P25* | P26 |
| P30 | P31 | P32 | P33 | P34 | P35 | P36 |
| P40 | *P41* | P42 | P43 | P44 | *P45* | P46 |
| P50 | P51 | P52 | P53 | P54 | P55 | P56 |
| P60 | *P61* | P62 | *P63* | P64 | *P65* | P66 |

FIG. 12D

| P00 | P01 | P02 | P03 | P04 | P05 | P06 |
|---|---|---|---|---|---|---|
| P10 | P11 | *P02* | P03 | *P04* | P05 | *P06* |
| P10 | P11 | P12 | P13 | P14 | P15 | P16 |
| P20 | P21 | *P22* | P23 | P24 | P25 | *P26* |
| P30 | P31 | P32 | P33 | P34 | P35 | P36 |
| P40 | P41 | *P42* | P43 | *P44* | P45 | *P46* |
| P50 | P51 | P52 | P53 | P54 | P55 | P56 |
| P60 | P61 | P62 | P63 | P64 | P65 | P66 |

FIG. 12E

| P00 | P01 | P02 | P03 | P04 | P05 | P06 |
|---|---|---|---|---|---|---|
| P10 | P11 | P12 | P13 | P14 | P15 | P16 |
| P20 | P21 | *P22* | P23 | *P24* | P25 | *P26* |
| P30 | P31 | P32 | P33 | P34 | P35 | P36 |
| P40 | P41 | *P42* | P43 | P44 | P45 | *P46* |
| P50 | P51 | P52 | P53 | P54 | P55 | P56 |
| P60 | P61 | *P62* | P63 | *P64* | P65 | *P66* |

FIG. 18

| R00 | G01 | R02 | G03 | R04 | G05 | R06 |
|---|---|---|---|---|---|---|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 19

| R00 | G01 | R02 | G03 | R04 | G05 | R06 |
|---|---|---|---|---|---|---|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 20

| R00 | G01 | R02 | G03 | R04 | G05 | R06 |
|---|---|---|---|---|---|---|
| G10 | B11 | G12 | B13 | G14 | B15 | G16 |
| R20 | G21 | R22 | G23 | R24 | G25 | R26 |
| G30 | *B31* | G32 | *B33* | G34 | *B35* | G36 |
| R40 | G41 | R42 | G43 | R44 | G45 | R46 |
| G50 | *B51* | G52 | B53 | G54 | *B55* | G56 |
| R60 | G61 | R62 | G63 | R64 | G65 | R66 |
| G70 | *B71* | G72 | *B73* | G74 | *B75* | G76 |
| R80 | G81 | R82 | G83 | R84 | G85 | R86 |

FIG. 21

| R00 | G01 | R02 | G03 | R04 | G05 | R06 |
|---|---|---|---|---|---|---|
| G10 | B11 | *G12* | B13 | *G14* | B15 | *G16* |
| R20 | G21 | R22 | G23 | R24 | G25 | R26 |
| G30 | B31 | *G32* | B33 | G34 | B35 | *G36* |
| R40 | G41 | R42 | G43 | R44 | G45 | R46 |
| G50 | B51 | *G52* | B53 | *G54* | B55 | *G56* |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 22

| R00 | G01 | R02 | G03 | R04 | G05 | R06 |
|-----|-----|-----|-----|-----|-----|-----|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 24

| R00 | G01 | R02 | G03 | R04 | G05 | R06 |
|---|---|---|---|---|---|---|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 25

| R00 | G01 | R02 | G03 | R04 | G05 | R06 |
|---|---|---|---|---|---|---|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 26

| R00 | G01 | R02 | G03 | R04 | G05 | R06 |
|-----|-----|-----|-----|-----|-----|-----|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

FIG. 27

| R00 | G01 | R02 | G03 | R04 | G05 | R06 |
|-----|-----|-----|-----|-----|-----|-----|
| G10 | B11 | G12 | B13 | G14 | B15 | G16 |
| R20 | G21 | R22 | G23 | R24 | G25 | R26 |
| G30 | B31 | G32 | B33 | G34 | B35 | G36 |
| R40 | G41 | R42 | G43 | R44 | G45 | R46 |
| G50 | B51 | G52 | B53 | G54 | B55 | G56 |
| R60 | G61 | R62 | G63 | R64 | G65 | R66 |
| G70 | B71 | G72 | B73 | G74 | B75 | G76 |
| R80 | G81 | R82 | G83 | R84 | G85 | R86 |

IMAGE PICKUP APPARATUS

BACKGROUND OF THE INVENTION

The present invention relates to image pickup apparatus, and more particularly relates to an image pickup apparatus in which fault pixels of a semiconductor image pickup device can be interpolated and compensated at high accuracy.

In general, when an image is taken by using an image pickup apparatus having a semiconductor image pickup device which comprises two-dimensionally arrayed pixels, faults occur in image pickup signal and a poor image output results when defect occurs in the pixels of the semiconductor image pickup device. Means of various kinds for compensating pixel defects have been used to make less conspicuous such defects in the output image. Known among the fundamental compensation systems is a system in which signals of the pixels around a fault pixel are used to replace the signal of the fault pixel (4-point interpolation system).

Further, Japanese Patent Publication No. 5-23551 discloses an image defect compensation apparatus in which fault pixel signals can be compensated more accurately by reducing compensation error. It includes: an absolute value operation means for outputting absolute value signals by computing from pixel signals outputted from a plurality of image pickup devices arranged in a square matrix, absolute values of difference between respective two pixels between which a fault pixel signal is sandwiched in vertical, horizontal and slanting directions; a minimum difference detection means for detecting two pixel signals from which the smallest of the absolute value signals is derived; an average value operation means for computing an average value of the two pixel signals detected by the minimum difference detection means and outputting an average value signal; and a replacing means for replacing the fault pixel signal by the average value signal.

Here, supposing as shown in FIG. 1A a pixel 101 at the location indicated by a blank in the two pixel rows for outputting a black line in the horizontal direction as a fault pixel, a defect compensation system based on the 4-point compensation of surrounding pixels as described above is the system in which the fault pixel is replaced by an average value of those pixels indicated by the arrows, located above, below, and on the left and right sides of the fault pixel 101. When the fault pixel 101 shown in FIG. 1A is interpolated by this system, the interpolation using the average value results in an interpolation by a gray level as shown in FIG. 1B, since three pixels out of those used for interpolation are black and the other one is white. Thus, the fault pixel shown in FIG. 1A, while it should be interpolated by black, is interpolated by gray and some of the defect is uncorrected. If, therefore, the defect is in a region (for example a line or edge) where a steep change in luminance occurs within the image, a problem is caused that the interpolation error becomes greater and an effective compensation of the fault pixel is impossible. Further, according to the above described image defect compensation apparatus disclosed in Japanese Patent Publication No. 5-23551, though the compensation error becomes smaller and it is possible to compensate the fault pixel at high accuracy, only the two pixels by which the fault pixel is sandwiched in the vertical, horizontal or slanting directions are considered and hence the manner of pixel signals in a region surrounding the fault pixel cannot be accurately considered. This also results in a problem that a compensation of the fault pixel at high accuracy may not be possible in a region where luminance is steeply changing.

SUMMARY OF THE INVENTION

To eliminate the above problems in the fault pixel compensation systems used in conventional image pickup apparatus, it is a main object of the present invention to provide an image pickup apparatus in which fault pixels can be compensated at high accuracy so as to make defect less conspicuous even when the defect is in a region where luminance steeply changes within an output image, by considering an image configuration in the region surrounding the fault pixels.

In a first aspect of the present invention, there is provided an image pickup apparatus including: an image pickup means having a semiconductor image pickup device composed of two-dimensionally arrayed pixels, for converting object light into image signals; a fault pixel detection means for obtaining the position of fault pixels in the semiconductor image pickup device and, if the fault pixels are two-dimensionally consecutive, additionally obtaining a pattern of order of the fault pixels; a fault pixel information storage means for storing information concerning the fault pixels obtained at the fault pixel detection means; a surrounding image configuration detection means for detecting from information of pixels surrounding the fault pixels an image configuration of a region surrounding a fault pixel location obtained by the fault pixel detection means in the image signals obtained from the image pickup means; and a pixel defect compensation means for selecting pixels from a surrounding of the fault pixels based on the image configuration detected by the surrounding image configuration detection means and performing pixel defect compensation by interpolating the fault pixels using the selected pixels.

Since the image configuration (line and its direction, edge and its direction, surface) of a region surrounding the fault pixels within an image is thus detected by the surrounding image configuration detection means and the pixels for interpolating the fault pixels are selected based on the image configuration, it is possible to achieve an image pickup apparatus in which compensation at high accuracy is possible so as to make defect less conspicuous even when the defect occurs in a region (for example line or edge) where luminance changes steeply in the output image. The above main object is thereby accomplished.

It is another object of the present invention to provide an image pickup apparatus in which, when fault pixels are two-dimensionally consecutive, processing for defect compensation is possible by a storage means having a relatively small memory capacity.

In a second aspect of the invention, the fault pixel information storage means in the image pickup apparatus according to the above first aspect, when fault pixels are two-dimensionally consecutive, stores the pixel location of one of the consecutive fault pixels and a pattern of order of the other fault pixels. Since the location of one of the fault pixels and order of the other fault pixels are stored as described if the fault pixels are two-dimensionally consecutive, a smaller memory capacity suffices when compared with the case of storing fault pixel location for each one pixel. The above object is thereby accomplished.

It is still another object of the present invention to provide an image pickup apparatus in which fault pixels can be accurately compensated by detecting at high accuracy an image configuration of a region surrounding a fault pixel location.

In a third aspect of the invention, the surrounding image configuration detection means in the image pickup apparatus according to the above first or second aspect includes: a signal level detection means for obtaining respective signal levels of a plurality of pixels surrounding a fault pixel; a first relative level detection means for, of signal level data of the plurality of pixels obtained from the signal level detection means, placing those of a plurality of pixels located above the fault pixel together into a horizontally oriented group, the signal level of one pixel in the group used as a reference pixel signal level to obtain relative signal levels of the other pixels with respect to the reference pixel signal level; a second relative level detection means for, of signal level data of the plurality of pixels obtained from the signal level detection means, placing those of a plurality of pixels located below the fault pixel together into a horizontally oriented group, the signal level of one pixel in the group used as a reference pixel signal level to obtain relative signal levels of the other pixels with respect to the reference pixel signal level; a third relative level detection means for, of signal level data of the plurality of pixels obtained from the signal level detection means, placing those of a plurality of pixels located on the right side of the fault pixel together into a vertically oriented group, the signal level of one pixel in the group used as a reference pixel signal level to obtain relative signal levels of the other pixels with respect to the reference pixel signal level; a fourth relative level detection means for, of signal level data of the plurality of pixels obtained from the signal level detection means, placing those of a plurality of pixels located on the left side of the fault pixel together into a vertically oriented group, the signal level of one pixel in the group used as a reference pixel signal level to obtain relative signal levels of the other pixels with respect to the reference pixel signal level; a pattern means for representing the relative signal level data obtained at the first to fourth relative level detection means in connection with pixel locations to pattern the pixel signal levels within each group; a comparison means for comparing the patterns obtained at the pattern means with previously set patterns; a first image configuration determination means for, in case that the patterns obtained at the pattern means are matched by the set pattern in the comparing operation at the comparison means, determining the matching set pattern as a surrounding image configuration; a second image configuration determination means for, in case that the patterns obtained at the pattern means are matched by none of the set patterns in the comparing operation at the comparison means, determining a previously set specific pattern as a surrounding image configuration; and a third image configuration determination means for, in case that the patterns obtained at the pattern means are matched by plural ones of the previously set patterns in the comparing operation at the comparison means, selecting from the plurality of matching set patterns one pattern having a smallest signal level difference among a plurality of interpolation pixels indicated by such set patterns to determine it as a surrounding image configuration.

In a fourth aspect of the invention, the pattern means in the image pickup apparatus according to the above third aspect makes the pixel signal levels in each group into a pattern by representing the relative signal level data in connection with pixel locations using an N-ary (N being a suitable number equal to or less than the number of gradations of image signal by the image pickup means). In a fifth aspect of the invention, the N-ary in the image pickup apparatus according to the above described fourth aspect is a ternary system where, of the signal levels of the plurality of pixels, each signal level of the other pixels is higher or lower than or the same as the reference pixel signal level. In a sixth aspect of the invention, the previously set patterns used in the comparison means in the image pickup apparatus according to the above fifth aspect are the patterns by which the direction of edges and lines can be determined.

As described, in the image pickup apparatus according to the above third to sixth aspects, the relative signal levels of pixels respectively located in the four directions surrounding a fault pixel from upper and lower and left and right sides thereof are made into patterns in connection with pixel locations, which are compared with previously set patterns to obtain an image configuration of a region surrounding the fault pixel. The image configuration can thus be detected at high accuracy so as to accurately compensate the fault pixel. The above object is thereby accomplished.

It is yet another object of the present invention to provide an image pickup apparatus in which an image configuration of a region surrounding a fault pixel location can be detected at high accuracy without increasing the region and an image configuration of the surrounding region in a slanting form can also be easily detected with including the direction thereof so that fault pixels can be compensated at high accuracy.

In a seventh aspect of the invention, the surrounding image configuration detection means in the image pickup apparatus according to the above first aspect includes: a reference pixel signal level detection means for determining as reference pixels a plurality of pixels surrounding a fault pixel and for obtaining the signal levels of the reference pixels; a first signal level detection means for detecting the signal levels of a first plurality of pixels respectively at locations uniformly shifted in the horizontal direction from the reference pixels without overlapping the fault pixel; a second signal level detection means for detecting the signal levels of a second plurality of pixels respectively at locations uniformly shifted in the vertical direction from the reference pixels without overlapping the fault pixel; a third signal level detection means for detecting the signal levels of a third plurality of pixels respectively at locations uniformly shifted toward the upper right from the reference pixels without overlapping the fault pixel; a fourth signal level detection means for detecting the signal levels of a fourth plurality of pixels respectively at locations uniformly shifted toward the lower right from the reference pixels without overlapping the fault pixel; a means for obtaining for each vertical line sum of signal levels of the pixels of the reference pixels on the same vertical line; a means for obtaining for each vertical line sum of signal levels of the pixels of the first plurality of pixels located on the same vertical line; a means for obtaining for each vertical line sum of signal levels of the pixels of the second plurality of pixels located on the same vertical line; a means for obtaining for each vertical line sum of signal levels of the pixels of the third plurality of pixels located on the same vertical line; a means for obtaining for each vertical line sum of signal levels of the pixels of the fourth plurality of pixels located on the same vertical line; a means for, of the reference pixels, obtaining ratios with respect to the signal level sum of the pixels on a predetermined vertical line of the signal level sums of the pixels on all the other vertical lines; a means for, of the first plurality of pixels, obtaining ratios with respect to the signal level sum of the pixels on a predetermined vertical line of the signal level sums of the pixels on all the other vertical lines; a means for, of the second plurality of pixels, obtaining ratios with respect to the signal level sum of the pixels on a predetermined vertical line of the signal level sums of the pixels on all the other vertical lines; a means for, of the third plurality of pixels, obtaining ratios with respect to the signal level sum of the pixels on a predetermined vertical line of the signal level sums of the pixels on all the other vertical lines; a means for, of the fourth plurality of pixels, obtaining ratios with respect to the signal level sum of the pixels on a predetermined vertical line of the signal level sums of the pixels on all the other vertical lines; a means for comparing the ratios of the signal level sums of the reference pixels with the ratios of the signal level sums, respectively, of the first, second, third and fourth to select the ratios of the signal level sums closest in value to the ratios of the signal level sums of the reference pixels; and a means for determining an image configuration of the surrounding region as a horizontally oriented edge or line when the ratios of the signal level sums of the first plurality of pixels are selected by the means for selecting, determining an image configuration of the surrounding region as a vertically oriented edge or line when the ratios of the signal level sums of the second plurality of pixels are selected, determining an image configuration of the surrounding region as a rightwardly ascending edge or line when the ratios of the signal level sums of the third plurality of pixels are selected, or determining an image configuration of the surrounding region as a rightwardly descending edge or line when the ratios of the signal level sums of the fourth plurality of pixels are selected.

In this manner, pixels surrounding a fault pixel and pixels at locations shifted horizontally, vertically, upper rightward and lower rightward from the surrounding pixels are used to detect an image configuration of a region surrounding the fault pixel. It is thereby possible to detect an image configuration of the surrounding region at high accuracy without an increase in the region for detecting the image configuration. Further, an image configuration of the surrounding region in slanting directions can also be readily detected with including the direction thereof. The above object is thereby accomplished.

It is a further object of the present invention to provide an image pickup apparatus in which detection of image configuration can be efficiently performed irrespective of the presence of a slanting image form in a region surrounding the fault pixel location.

In an eighth aspect of the invention, the surrounding image configuration detection means in the image pickup apparatus according to the above first aspect includes: a first surrounding image configuration detection means composed of the surrounding image configuration detection means according to the above third aspect; and a second surrounding image configuration detection means composed of the surrounding image configuration detection means according to the above seventh aspect. Detection of surrounding image configuration by the second surrounding image configuration detection means is performed only when a slanting line form is detected by the first surrounding image configuration detection means. By this construction, a detection of image configuration can be efficiently performed irrespective of the presence of image form along a slanting direction in the surrounding region of the fault pixel location. The above object is thereby accomplished.

It is a further object of the present invention to provide an image pickup apparatus in which, even when the direction is erroneously detected of an image configuration of the surrounding region of a fault pixel location, the fault pixel can be compensated without making it conspicuous.

In a ninth aspect of the present invention, the pixel defect compensation means in the image pickup apparatus according to the above first to eighth aspect interpolates a fault pixel by an average value of a plurality of selected pixels. By this construction, since the change is smooth between the fault pixel and surrounding pixels even if the direction is erroneously detected of an image configuration of the surrounding region of a fault pixel location, the fault pixel can be compensated without making it conspicuous. The above object is thereby accomplished.

It is a further object of the present invention to provide an image pickup apparatus in which a defect can be compensated without making it conspicuous even when the defect is in a region where luminance steeply changes within a color output image.

In a tenth aspect of the invention, there is provided an image pickup apparatus including: an image pickup means having a semiconductor image pickup device composed of two-dimensionally arrayed pixels, for converting object light into image pickup signals consisting of at least three kinds of color signals; a fault pixel detection means for obtaining the position of fault pixels in the semiconductor image pickup device and, if the fault pixels are two-dimensionally consecutive, additionally obtaining a pattern of order of the fault pixels; a fault pixel information storage means for storing information concerning the fault pixels obtained at the fault pixel detection means; a surrounding image configuration detection means for detecting from information of pixels of the same color as a fault pixel surrounding the fault pixel an image configuration of a region surrounding a fault pixel location obtained by the fault pixel detection means in the image signals obtained from the image pickup means; and a pixel defect compensation means for selecting pixels of the same color as a fault pixel from the surrounding of the fault pixels based on the image configuration detected by the surrounding image configuration detection means and performing pixel defect compensation by interpolating the fault pixels using the selected pixels.

By this construction, it is possible to achieve an image pickup apparatus in which color images can be obtained as compensated so as not to make defect conspicuous even when the defect occurs in a region of color output image where luminance steeply changes. The above object is thereby accomplished.

It is a further object of the present invention to provide an image pickup apparatus in which, when fault pixels are two-dimensionally consecutive in a color image, processing for defect compensation is possible by a storage means having a relatively small memory capacity.

In an eleventh aspect of the invention, the fault pixel information storage means in the image pickup apparatus according to the above tenth aspect, when fault pixels are two-dimensionally consecutive, stores the pixel location of one of the consecutive fault pixels and a pattern of order of the other fault pixels. Since the location of one of the fault pixels and order of the other fault pixels are stored as described if the fault pixels are two-dimensionally consecutive, compensation of fault pixels in a color image is possible at high accuracy by using a smaller memory capacity when compared with the case of storing fault pixel location for each one pixel. The above object is thereby accomplished.

It is a further object of the present invention to provide an image pickup apparatus in which fault pixels can be accurately compensated by detecting at high accuracy the image configuration of the region surrounding the location of a fault pixel in a color image.

In a twelfth aspect of the invention, the surrounding image configuration detection means in the image pickup apparatus according to the above tenth or eleventh aspect includes: a signal level detection means for obtaining respective signal levels of a plurality of pixels of the same color as a fault pixel surrounding the fault pixel; a first relative level detection means for, of signal level data of the plurality of pixels obtained from the signal level detection means, placing those of a plurality of pixels located above the fault pixel together into a horizontally oriented group, the signal level of one pixel in the group used as a reference pixel signal level to obtain relative signal levels of the other pixels with respect to the reference pixel signal level; a second relative level detection means for, of signal level data of the plurality of pixels obtained from the signal level detection means, placing those of a plurality of pixels located below the fault pixel together into a horizontally oriented group, the signal level of one pixel in the group used as a reference pixel signal level to obtain relative signal levels of the other pixels with respect to the reference pixel signal level; a third relative level detection means for, of signal level data of the plurality of pixels obtained from the signal level detection means, placing those of a plurality of pixels located on the right side of the fault pixel together into a vertically oriented group, the signal level of one pixel in the group used as a reference pixel signal level to obtain relative signal levels of the other pixels with respect to the reference pixel signal level; a fourth relative level detection means for, of signal level data of the plurality of pixels obtained from the signal level detection means, placing those of a plurality of pixels located on the left side of the fault pixel together into a vertically oriented group, the signal level of one pixel in the group used as a reference pixel signal level to obtain relative signal levels of the other pixels with respect to the reference pixel signal level; a pattern means for representing the relative signal level data obtained at the first to fourth relative level detection means in connection with pixel locations to pattern the pixel signal levels within each group; a comparison means for comparing the patterns obtained at the pattern means with previously set patterns; a first image configuration determination means for, in case that the patterns obtained at the pattern means are matched by the set pattern in the comparing operation at the comparison means, determining the matching set pattern as a surrounding image configuration; a second image configuration determination means for, in case that the patterns obtained at the pattern means are matched by none of the set patterns in the comparing operation at the comparison means, determining a previously set specific pattern as a surrounding image configuration; and a third image configuration determination means for, in case that the patterns obtained at the pattern means are matched by plural ones of the previously set patterns in the comparing operation at the comparison means, selecting from the plurality of matching set patterns one pattern having a smallest signal level difference among a plurality of interpolation pixels indicated by such set patterns to determine it as a surrounding image configuration.

In a thirteenth aspect of the invention, the pattern means in the image pickup apparatus according to the above twelfth aspect makes the pixel signal levels in each group into a pattern by representing the relative signal level data in connection with pixel locations using an N-ary (N being a suitable number equal to or less than the number of gradations of image signal by the image pickup means). In a fourteenth aspect of the invention, the N-ary in the image pickup apparatus according to the above described thirteenth aspect is a ternary system where, of the signal levels of the plurality of pixels, each signal level of the other pixels is higher or lower than or the same as the reference pixel signal level. In a fifteenth aspect of the invention, the previously set patterns used in the comparison means in the image pickup apparatus according to the above twelfth aspect are the patterns by which the direction of edges and lines can be determined.

As described, in the image pickup apparatus according to the above twelfth to fifteenth aspects, the relative signal levels of pixel groups respectively located in the four directions surrounding a fault pixel from upper and lower and left and right sides thereof are made into patterns in connection with pixel locations, which are compared with previously set patterns to obtain an image configuration of a region surrounding the fault pixel. The image configuration can be detected at high accuracy and it is possible to accurately compensate the fault pixel even in a color image. The above object is thereby accomplished.

It is a further object of the present invention to provide an image pickup apparatus in which image configuration of a region surrounding a fault pixel location can be detected by means of comparison even between pixels of different colors and at the same time an image configuration of the surrounding region of the fault pixel location even in a slanting form is detected at high accuracy with including the direction thereof without increasing the region, thereby making possible a highly accurate compensation of fault pixels.

In a sixteenth aspect of the invention, the surrounding image configuration detection means in the image pickup apparatus according to the above tenth aspect includes: a reference pixel signal level detection means for determining as reference pixels a plurality of pixels of the same color as a fault pixel surrounding the fault pixel and for obtaining the signal levels of the reference pixels; a first signal level detection means for detecting the signal levels of a first plurality of pixels all of the same color respectively at locations uniformly shifted in the horizontal direction from the reference pixels without overlapping the fault pixel; a second signal level detection means for detecting the signal levels of a second plurality of pixels all of the same color respectively at locations uniformly shifted in the vertical direction from the reference pixels without overlapping the fault pixel; a third signal level detection means for detecting the signal levels of a third plurality of pixels all of the same color respectively at locations uniformly shifted toward the upper right from the reference pixels without overlapping the fault pixel; a fourth signal level detection means for detecting the signal levels of a fourth plurality of pixels all of the same color respectively at locations uniformly shifted toward the lower right from the reference pixels without overlapping the fault pixel; a means for obtaining for each vertical line sum of signal levels of the pixels of the reference pixels on the same vertical line; a means for obtaining for each vertical line sum of signal levels of the pixels of the first plurality of pixels located on the same vertical line; a means for obtaining for each vertical line sum of signal levels of the pixels of the second plurality of pixels located on the same vertical line; a means for obtaining for each vertical line sum of signal levels of the pixels of the third plurality of pixels located on the same vertical line; a means for obtaining for each vertical line sum of signal levels of the pixels of the fourth plurality of pixels located on the same vertical line; a means for, of the reference pixels, obtaining ratios with respect to the signal level sum of the pixels on a predetermined vertical line of the signal level sums of the pixels on all the other vertical lines; a means for, of the first plurality of pixels, obtaining ratios with respect to the signal level sum of the pixels on a predetermined vertical line of the signal level sums of the pixels on all the other vertical lines; a means for, of the second plurality of pixels, obtaining ratios with respect to the signal level sum of the pixels on a predetermined vertical line of the signal level sums of the pixels on all the other vertical lines; a means for, of the third plurality of pixels, obtaining ratios with respect to the signal level sum of the pixels on a predetermined vertical line of the signal level sums of the pixels on all the other vertical lines; a means for, of the fourth plurality of pixels, obtaining ratios with respect to the signal level sum of the pixels on a predetermined vertical line of the signal level sums of the pixels on all the other vertical lines; a means for comparing the ratios of the signal level sums of the reference pixels with the ratios of the signal level sums, respectively, of the first, second, third and fourth to select the ratios of the signal level sums closest in value to the ratios of the signal level sums of the reference pixels; and a means for determining an image configuration of the surrounding region as a horizontally oriented edge or line when the ratios of the signal level sums of the first plurality of pixels are selected by the means for selecting, determining an image configuration of the surrounding region as a vertically oriented edge or line when the ratios of the signal level sums of the second plurality of pixels are selected, determining an image configuration of the surrounding region as a rightwardly ascending edge or line when the ratios of the signal level sums of the third plurality of pixels are selected, or determining an image configuration of the surrounding region as a rightwardly descending edge or line when the ratios of the signal level sums of the fourth plurality of pixels are selected.

By this construction, since a strong correlation in relative change of luminance (i.e., level ratio) is likely to occur even between pixels of different colors, pixels all of the same color at the locations shifted horizontally, vertically, upper rightward and lower rightward from such pixels are used to detect an image configuration of a region surrounding the fault pixel. An image configuration of a surrounding region of the fault pixel in a color image can thus be detected at high accuracy without an increase in the region for detecting the image configuration and an image configuration of the surrounding region in slanting directions can also be readily detected with including the direction thereof. The above object is thereby accomplished.

It is a further object of the present invention to provide an image pickup apparatus in which detection of image configuration can be efficiently performed in a color image irrespective of the presence of a slanting image form in a region surrounding the fault pixel location.

In a seventeenth aspect of the invention, the surrounding image configuration detection means in the image pickup apparatus according to the above tenth aspect includes: a first surrounding image configuration detection means composed of the surrounding image configuration detection means as disclosed in the above twelfth aspect; and a second surrounding image configuration detection means composed of the surrounding image configuration detection means as disclosed in the above sixteenth aspect. Detection of surrounding image configuration by the second surrounding image configuration detection means is performed only when a slanting line form is detected by the first surrounding image configuration detection means. By this construction, a detection of image configuration can be efficiently performed irrespective of the presence of image form along a slanting direction in the surrounding region of the fault pixel location in a color image. The above object is thereby accomplished.

It is a further object of the present invention to provide an image pickup apparatus in which, even when the direction is erroneously detected of an image configuration of the surrounding region of a fault pixel location, a color image can be obtained as compensated for the fault pixel without making it conspicuous.

In an eighteenth aspect of the invention, the pixel defect compensation means in the image pickup apparatus according to the above tenth to seventeenth aspect interpolates a fault pixel by an average value of a plurality of selected pixels of the same color as the fault pixel. By this construction, since the change is smooth between the fault pixel and surrounding pixels in a color image even if the direction is erroneously detected of an image configuration of the surrounding region of a fault pixel location, the fault pixel in color image can be compensated without making it conspicuous. The above object is thereby accomplished.

It is a further object of the present invention to provide an image pickup apparatus adapted so as not to be affected by the defect when picked up images are compressed to be recorded.

In a nineteenth aspect of the invention, the image pickup apparatus according to the above first to eighteenth aspect further includes a means by which image pickup signal having been compensated for fault pixels at the pixel defect compensation means is compressed and recorded to a recording medium. By this construction, since the image pickup signal is compressed and recorded to the recording medium after compensating for the defect, it is possible to prevent an effect produced by defect when the picked up images are compressed to be recorded. The above object is thereby accomplished.

It is a further object of the present invention to provide an image pickup apparatus capable of reducing time duration for recording of picked up images and of performing compensation of fault pixels at high accuracy.

In a twentieth aspect of the invention, the image pickup apparatus according to the above first to nineteenth aspect further includes: an auxiliary defect compensation means for interpolating a fault pixel of the semiconductor image pickup device by pixels surrounding the fault pixel; a means for compressing and recording to a recording medium image signal having been subjected to fault pixel compensation at the auxiliary defect compensation means; and a means for expanding image signal read out from the recording medium and reproducing it with performing pixel defect compensation by the pixel defect compensation means.

In thus constructed image pickup apparatus, a less accurate defect compensation is performed at the time of recording by the auxiliary defect compensation means of high processing speed and a highly accurate defect compensation is performed at the time of reproduction. It is thereby possible both to reduce the time duration for recording picked up images and to obtain an output image compensated for fault pixels at high accuracy. The above object is thereby accomplished.

BRIEF DESCRIPTION OF THE DRAWING

FIG. 2 is a block diagram showing an overall construction of an embodiment of image pickup apparatus according to the present invention.

FIGS. 12A to 12E each show the manner of shifting of reference pixels surrounding a fault pixel in the detection processing shown in the flowchart of FIG. 11.

FIG. 18 shows the manner of arrangement of a fault pixel and surrounding reference pixels of which signal levels are detected.

FIG. 19 shows the manner of horizontally shifting the reference pixels shown in FIG. 18.

FIG. 20 shows the manner of vertically shifting the reference pixels shown in FIG. 18.

FIG. 21 shows the manner of shifting the reference pixels shown in FIG. 18 toward upper right.

FIG. 22 shows the manner of shifting the reference pixels shown in FIG. 18 toward lower right.

FIG. 24 shows the manner of arrangement of a fault pixel in a color image and surrounding reference pixels of which signal levels are detected in the sixth embodiment shown in FIG. 23.

FIG. 25 shows the manner of horizontally shifting the reference pixels shown in FIG. 24.

FIG. 26 shows the manner of vertically shifting the reference pixels shown in FIG. 24.

FIG. 27 shows the manner of shifting the reference pixels shown in FIG. 24 toward lower right.

DESCRIPTION OF THE PREFERRED EMBODIMENTS

Figure 1A:
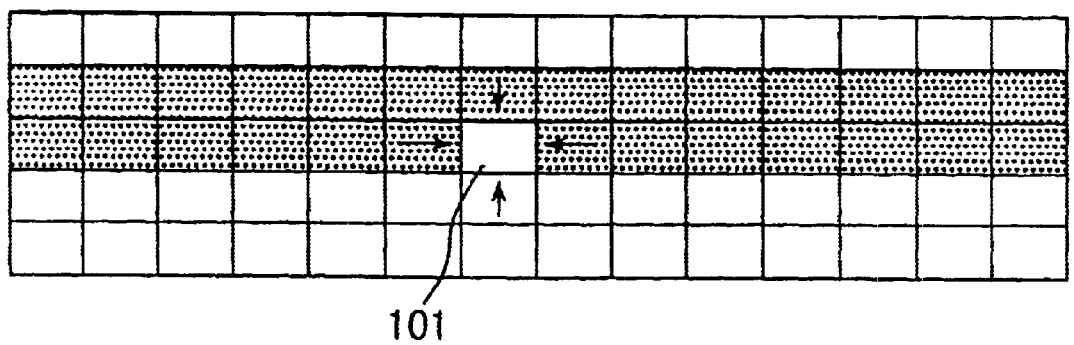
FIGS. 1A, 1B illustrate a conventional pixel defect compensation system.
Figure 1B:
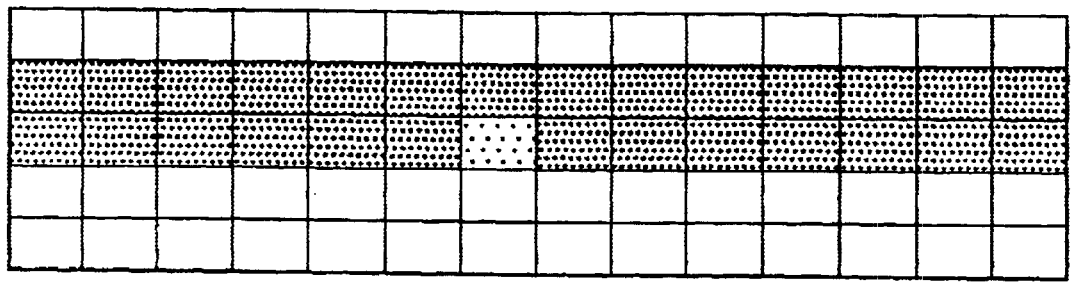

Some embodiments of the present invention will now be described. FIG. 2 is a block diagram showing an overall construction of an embodiment of the image pickup apparatus according to the present invention. Referring to FIG. 2, denoted by numeral 1 is a lens; an optical image formed by the lens 1 passes through a stop/shutter mechanism 2 and is inputted to a CCD image pickup device 4 having two-dimensionally arrayed pixels via an optical LPF and infrared cut filter 3. Image pickup signals derived from photoelectric conversion at the image pickup device 4 are processed of noise canceling and sensitivity adjustment at CDS (correlative double sampling circuit)/AGC circuit 5 and then subjected to A/D conversion at an analog-to-digital converter 6 so as to be temporarily stored to an image memory 7.

What is denoted by numeral 8 is a pixel defect compensation processing section which reads out the temporarily stored image pickup signals (image data) from the image memory 7 to detect the position and number of pixels corresponding to defects and, when fault pixels are two-dimensionally consecutive, a pattern of their order. Such defect information is stored to a defect information storage means 12. Further, the pixel defect compensation processing section 8 reads the defect information out from the defect information storage means 12 and, based on such defect information, detects an image configuration of a region surrounding a fault pixel. Based on such detected image configuration, pixels are selected from the surrounding of the fault pixel and pixel defect compensation processing is performed by interpolating the fault pixel using the selected pixels. After totally compensated for defects by the processing at the above described pixel defect compensation processing section 8, the image pickup signals temporarily stored at the image memory 7 are processed for compression, etc., at a record signal processing section 9 so as to be converted into a signal form suitable for recording. The image data processed at the record signal processing section 9 is converted to a signal level and rate suitable for recording media at a recording media interface 10 and is recorded at a recording media 11 such as SRAM, flash memory, magnetic memory, etc.

FIG. 2 further includes: 13, a timing generator for generating drive timing of the CCD image pickup device 4; 14, a synchronizing signal generator for supplying synchronizing signal to the timing generator 13; 16, CCD driver for power amplification of drive signal of the CCD image pickup device; 17, a motor driver for focusing and zooming of lens 1 as well as for stop drive and shutter drive of the stop/shutter mechanism 2; and 15, CPU for controlling operations of the respective sections described above.

Figure 3:
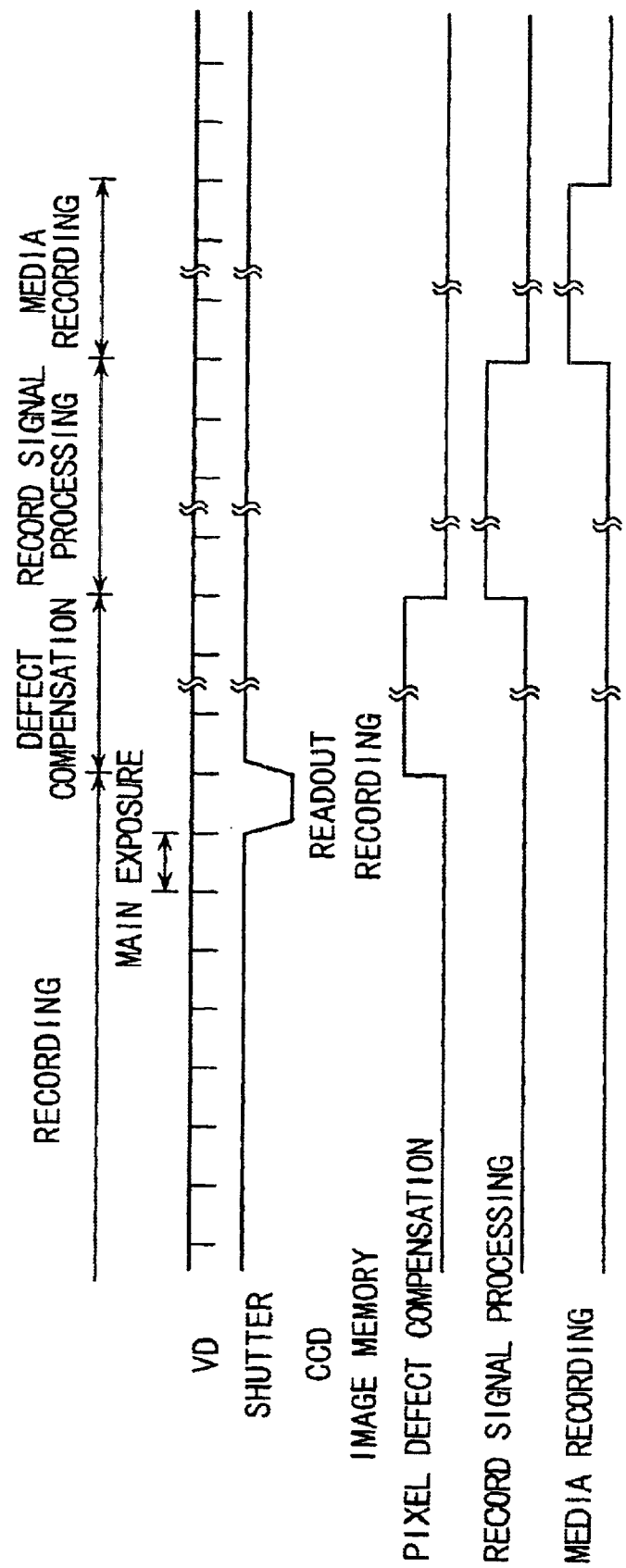
FIG. 3 is a timing chart for explaining an outline of operation sequence of the embodiment shown in FIG. 2.

A description will be given below with respect to operation sequence of an image pickup apparatus of the above described construction. In an outlined operation sequence as shown in the timing chart of FIG. 3, charge accumulating operation of the image pickup device 4 is started upon pressing of a shutter button (not shown). The period from the start of the charge accumulating time to closing of the shutter is for the main exposure and readout of signal is performed in the period during which the shutter is closed.

The image pickup signal outputted from the image pickup device 4 is temporarily stored to the image memory 7. The image pickup signal stored to the image memory 7 is then subjected to defect compensation processing through the pixel defect compensation processing section 8 and defect information storage means 12. Next, the image pickup signal after thus compensated for defects is processed into a record signal at the record signal processing section 9 and then recorded into the recording media 11. It should be noted that, in FIG. 3, "VD" represents a fundamental pulse (vertical synchronizing signal) generated at the synchronizing signal generator 14, for reading out all the information in the image pickup device 4.

Figure 4A:
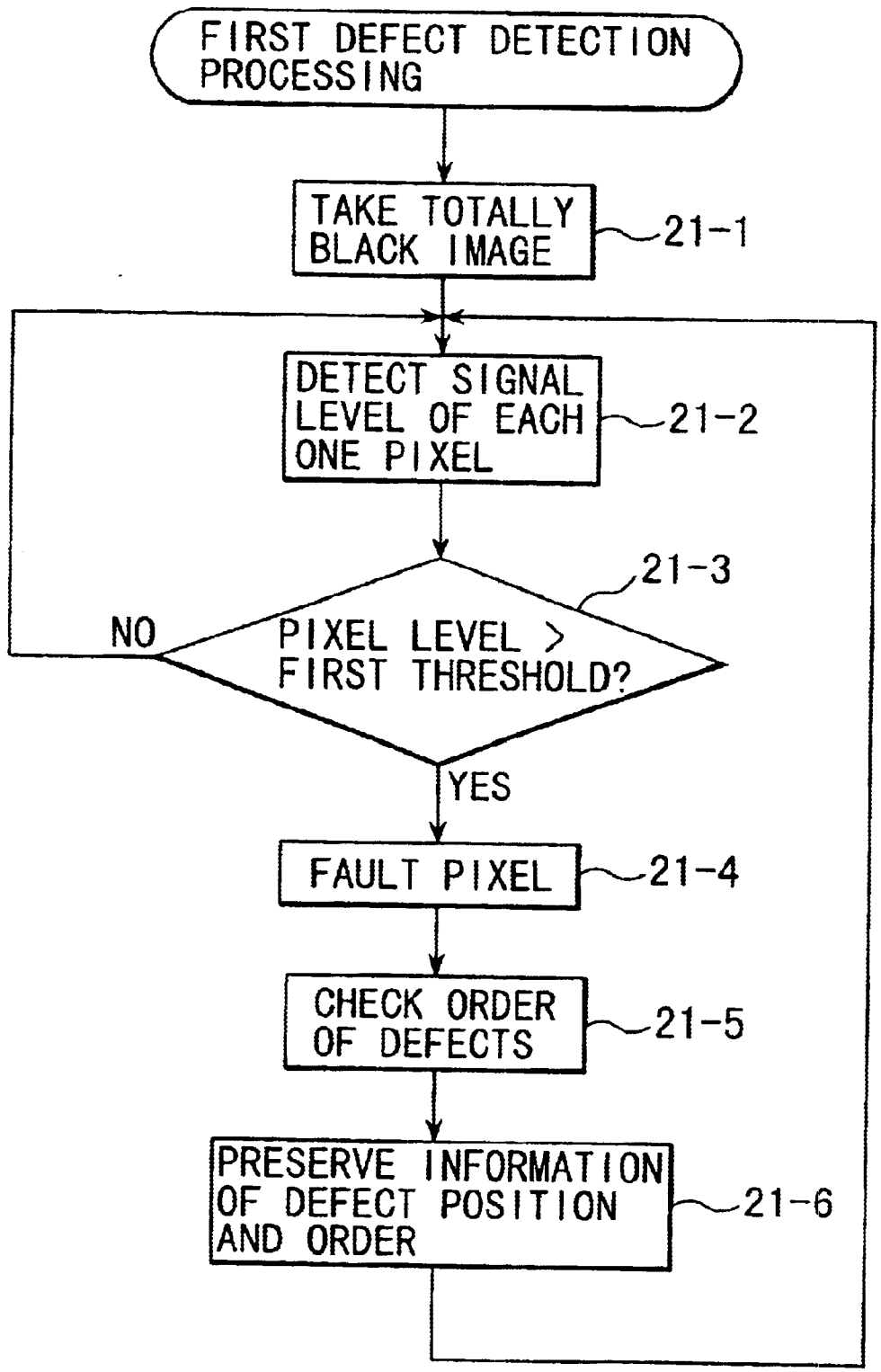
FIGS. 4A, 4B each are a timing chart for explaining detection processing of fault pixels in the present invention.

A detailed description will now be given with respect to the compensation processing of fault pixels at the pixel defect compensation processing section 8 and defect information storage means 12. The processing will first be described of detection of fault pixels to be performed at the pixel defect compensation processing section 8. This detection processing includes performance of a first defect detection processing where a totally black image is taken to detect positions of fault pixels and an order of the fault pixels in picking up a black image and a second defect detection processing where a totally white image is taken to detect fault pixels and an order of the fault pixels in picking up a white image. Particularly, in the first defect detection processing as shown in the flow chart of FIG. 4A, a black image is taken (step 21-1), signal level is detected for each one pixel (step 21-2), determination is made as to whether signal level of each pixel is lower or higher than a predetermined first threshold value (step 21-3), and, if higher than the first threshold, such pixels are determined as fault pixels (step 21-4). Next, if the fault pixels are adjoining, i.e., two-dimensionally consecutive, their order is checked (step 21-5), and defect information concerning positions of the fault pixels and order of the fault pixels are preserved in the defect information storage means 12 (step 21-6).

Figure 4B:
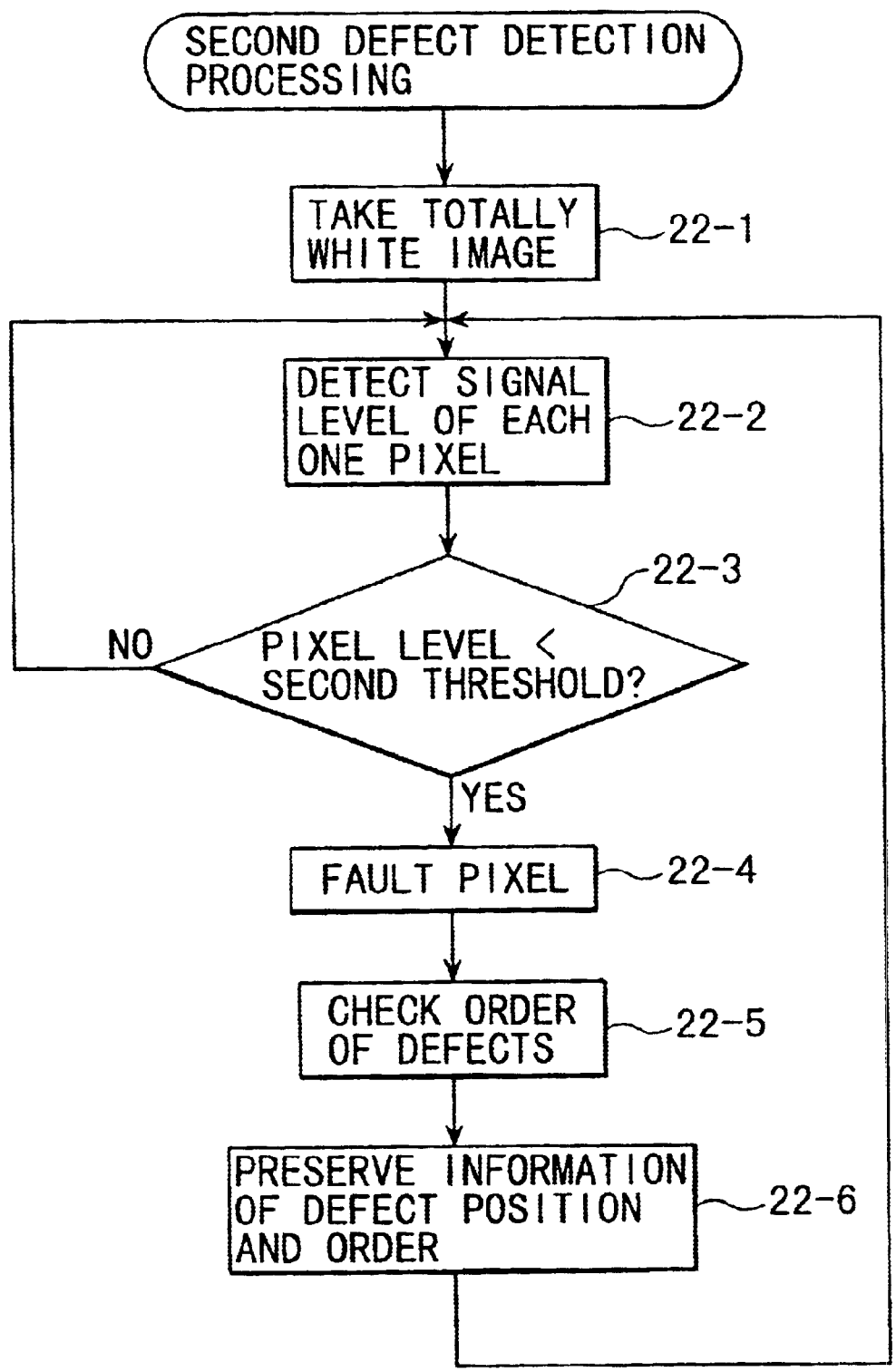

Further, similarly in the second defect detection processing as shown in the flowchart of FIG. 4B, a white image is taken (step 22-1), signal level is detected for each one pixel (step 22-2), determination is made as to whether signal level of each pixel is lower or higher than a predetermined second threshold value (step 22-3), and, if lower than the second threshold, such pixels are determined as fault pixels (step 22-4). Next, if fault pixels are adjoining, i.e., two-dimensionally consecutive, their order is checked (step 22-5), and defect information concerning positions of the fault pixels and order of the fault pixels are preserved in the defect information storage means 12 (step 22-6).

It should be noted that the defect information concerning fault pixels may be detected in the above manner every time when taking an image and be stored to the defect information storage means 12. With an image pickup device, such as CCD image pickup device, internally provided of the image pickup apparatus, however, it is also possible to store a previously detected defect information at the defect information storage means and to use such defect information when taking an image, since such defect information as positions of fault pixels can be previously detected.

A description will now be given with respect to an embodiment of pixel defect compensation processing. The defect compensation according to the present invention in principle attempts to interpolate by determining (inferring) to what type of component of image configuration in its surrounding region a fault pixel belongs. In the example shown in FIG. 1A, for instance, the fault pixel 101 highly likely belongs to a horizontal black line by judging from the image configuration in its surrounding region. Hence it is interpolated by an average of the pixels on the two horizontal sides thereof, i.e., black level.

Figure 5:
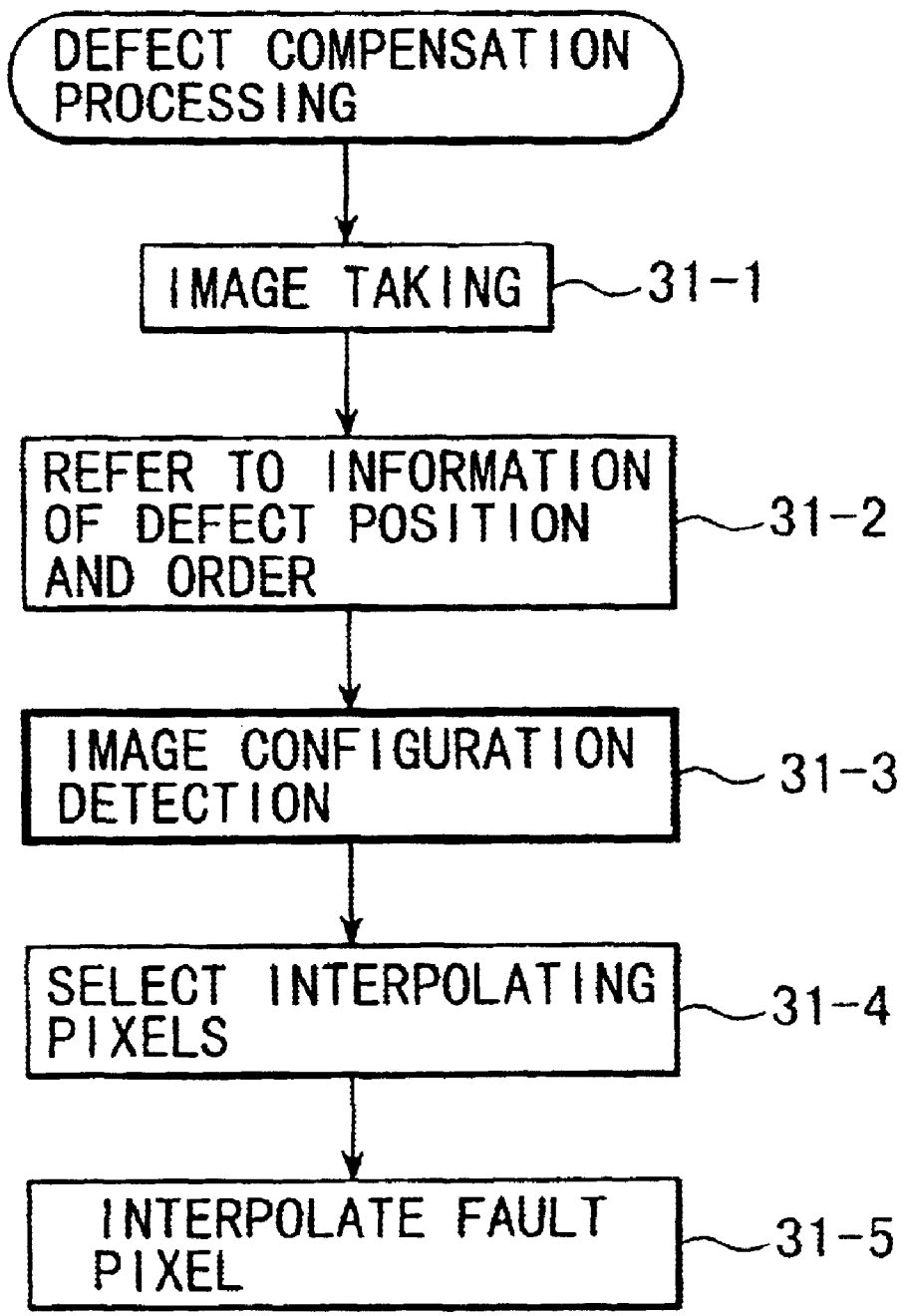
FIG. 5 is a flowchart for explaining an outline of fault pixel compensation processing in the present invention.

Such fundamental defect compensation processing mode will now be described by way of the flowchart in FIG. 5. First, an object image is captured by an image taking operation of the image pickup device (step 31-1); the positions of fault pixels in image pickup signal from the image pickup device and, if the fault pixels are two-dimensionally consecutive, their order of arrangement are detected and stored and these stored data are read out (step 31-2); and, based on pixel information of a surrounding of a fault pixel in image signal, an image configuration is detected of a region surrounding the position of the fault pixel (step 31-3). Next, based on the detected image configuration, two pixels for example oriented in a vertical, horizontal or slanting direction are selected as interpolating pixels from the surrounding region of the fault pixel (step 31-4) and a defect compensation is performed by interpolating the fault pixel by an average level of the interpolating pixels (step 31-5).

Figure 6:
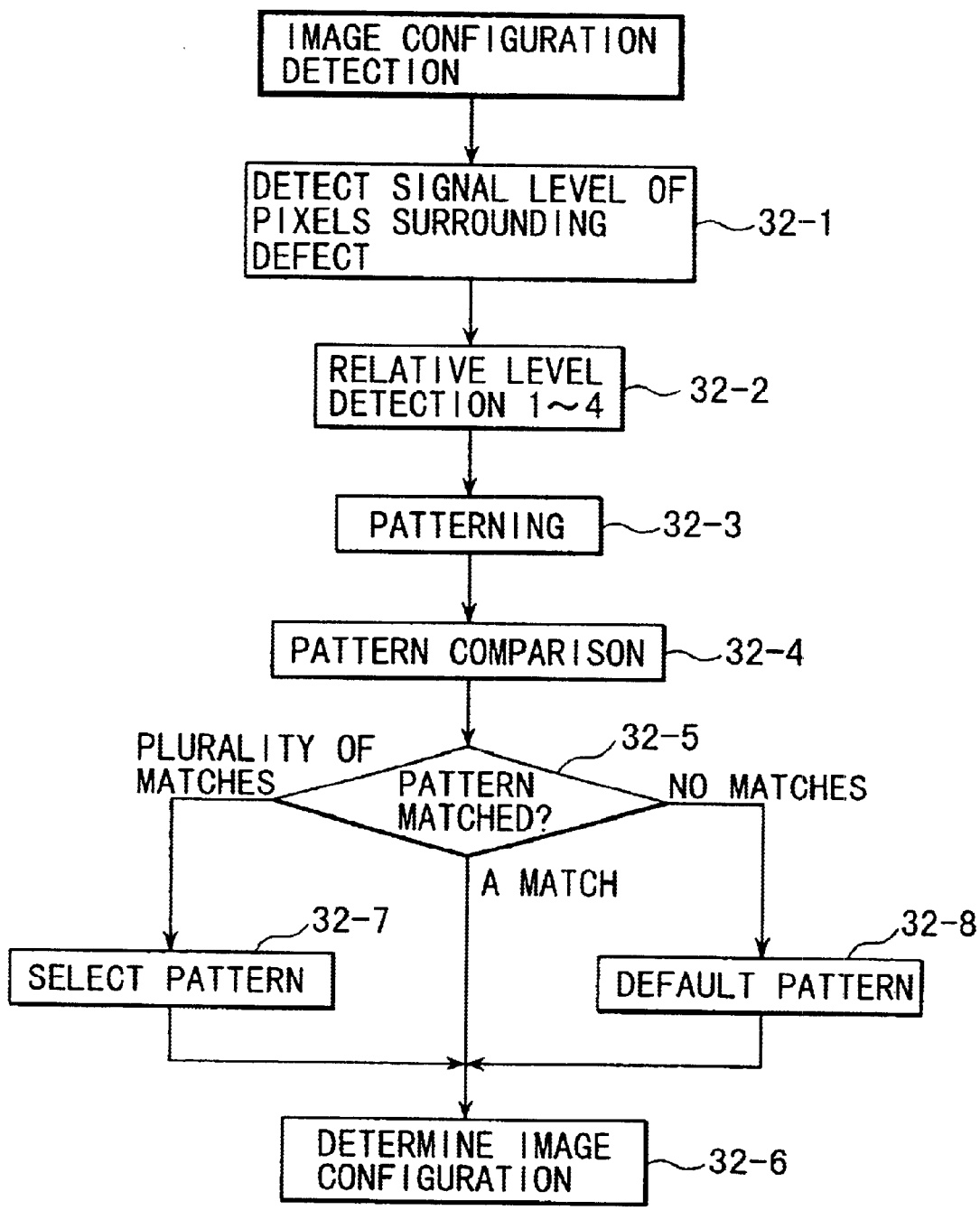
FIG. 6 is a flowchart for explaining in detail a first embodiment of the image configuration detection processing in the flowchart shown in FIG. 5.
Figure 7:
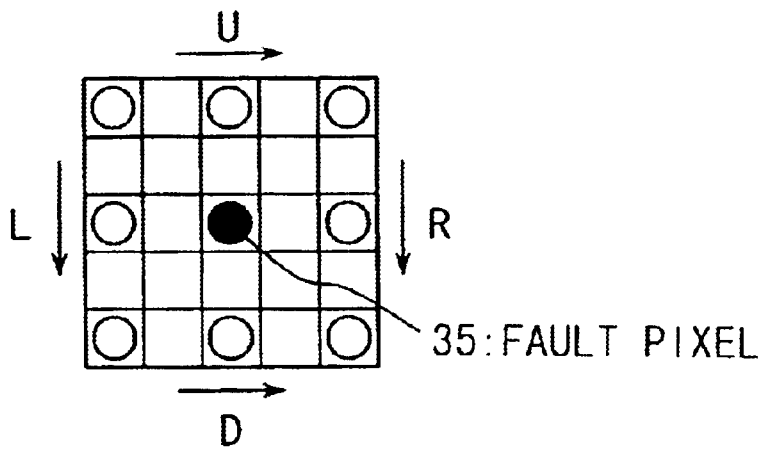
FIG. 7 shows the manner of arrangement of a fault pixel and surrounding pixels of which signal levels are detected.

A first embodiment of the image configuration detection (step 31-3) in this defect compensation processing will now be described by way of the flowchart in FIG. 6. First, signal levels of a plurality of pixels surrounding the fault pixel are detected (step 32-1). In FIG. 7, for example, signal levels of the eight pixels (○ mark) surrounding a fault pixel (● mark) 35 are detected. Here, groups are formed respectively by the three pixels oriented in the "U" direction located above the fault pixel, the three pixels in the "D" direction below, the three pixels in the "R" direction on the right side, and the three pixels in the "L" direction on the left side. In each of these groups, one pixel is regarded as a reference pixel and relative signal levels of the other pixels are determined with respect to the signal level (luminance) of the reference pixel (step 32-2). For example, in each of the directions of "U", "D", "R", "L", the relative values are obtained starting from the originating side of the arrow, i.e., in order of the relative value of the second pixel with respect to the first pixel and then the relative value of the third pixel with respect to the second pixel. A relative value is one of the three values of "higher", "same", or "lower" where the signal levels of two pixels of their difference within ±12.5% are regarded as the same. Here, such relative values may be represented in an N-ary (N being any suitable integer equal to or less than the number of gradations of image pickup signal of the image pickup device).

Figure 8A:
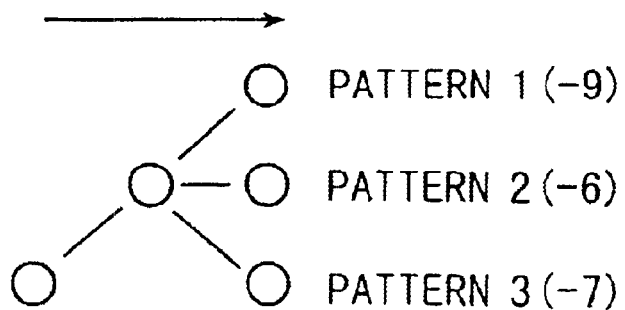
FIGS. 8A, 8B, 8C show a classification of patterns of relative signal levels.
Figure 8B:
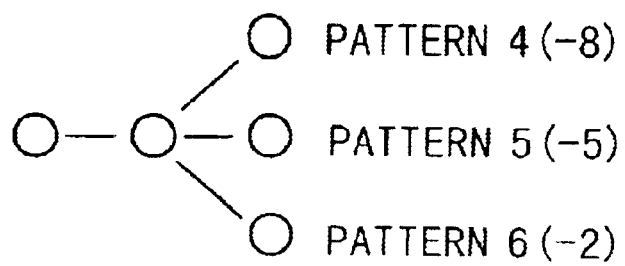
Figure 8C:
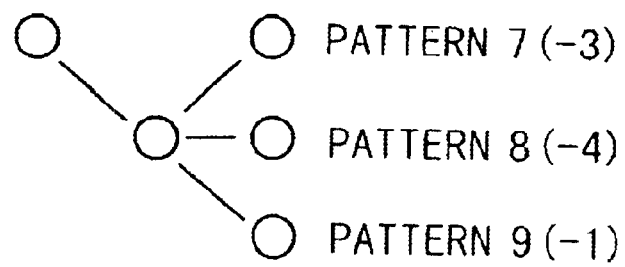

Based on thus obtained relative values, the relative values in each group of-the respective direction can be classified into nine pattern types of pattern 1 to pattern 9 as shown in FIGS. 8A, 8B, 8C. It should be noted that, in FIGS. 8A, 8B, 8C, the pattern types in the parentheses indicate the reverse pattern types where relative values are obtained along the reversed directions of the arrows. Referring to FIG. 8A, for example, pattern 1 represents a pattern where the relative value of the second pixel (at the center) is higher than that of the first pixel (on the left) and the relative value of the third pixel (on the right) is still higher than that of the second pixel (at the center); pattern 2 indicates a pattern where the relative value of the second pixel is higher than that of the first pixel and the relative value of the third pixel is the same as that of the second pixel; and pattern 3 indicates a pattern where the relative value of the second pixel is higher than that of the first pixel and the relative value of the third pixel is lower than that of the second pixel. Further, pattern-5 in FIG. 8B indicates a pattern where all the pixels are at the same level.

Figure 9A:
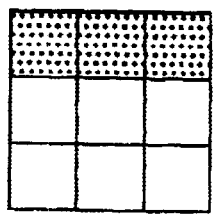
FIGS. 9A to 9K show examples of patterns of image configuration in the surrounding region.
Figure 9B:
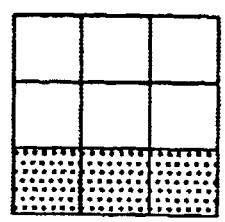

By using such 9 pattern forms in representing the relative signal levels of the pixel groups in the four directions of "U", "D", "R", "L", in a manner corresponding to the pixel positions, the relative signal levels of the eight pixels around the fault pixel are made into a pattern by means of the four sets of patterns (step 32-3). Thus obtained pattern of the relative signal levels of the four sets of pixel groups in the surrounding region is then compared with previously set patterns (step 32-4). In particular, all possible patterns are previously provided and the pattern obtained from the relative signal levels of the pixel groups in the surrounding region is compared with the provided patterns. In the case of a horizontal edge configuration as shown in FIGS. 9A, 9B, for example, a pattern of pattern 5 must occur in the U- or D-oriented pixel group and pattern-5 must not occur in the L- and R-oriented pixel groups. Accordingly, if such conditions are met in the pattern to be compared, the image configuration of the surrounding region is determined as a horizontal edge configuration.

Figure 9C:
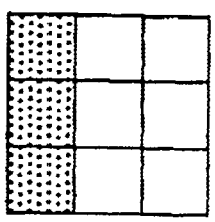
Figure 9D:
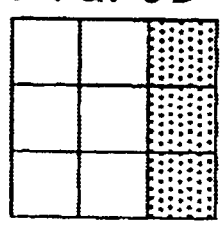
Figure 9E:
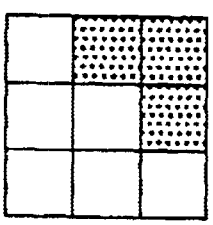
Figure 9F:
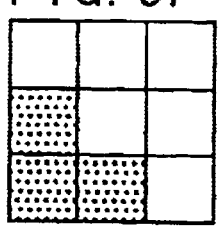
Figure 9G:
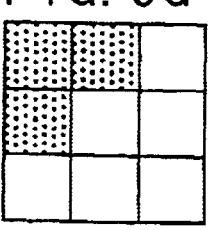
Figure 9H:
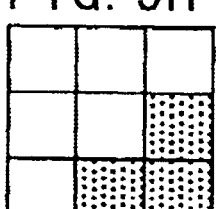

Further, in the case of a vertical edge configuration as shown in FIGS. 9C, 9D, pattern-5 must occur in the R- or L-oriented pixel group and pattern-5 must not occur in the U- and D-oriented pixel groups. Accordingly, if such conditions are met in the pattern to be compared, the image configuration in the surrounding region is determined as a vertical edge configuration. Further, in the case of an edge configuration descending toward the right as shown in FIGS. 9E, 9F, pattern-5 must occur in the U- and R-oriented pixel groups or in the L- and D-oriented pixel groups and other additional pattern-5 may occur. Accordingly, if such conditions are met in the pattern to be compared, the image configuration in the surrounding region is determined as an edge configuration descending toward the right. Also, in the case of an edge configuration ascending toward the right as shown in FIGS. 9G, 9H, pattern-5 must occur in the D- and R-oriented pixel groups or in the U- and L-oriented pixel groups and other additional pattern-5 may occur. Accordingly, if such conditions are met in the pattern to be compared, the image configuration in the surrounding region is determined as an edge configuration ascending toward the right.

Figure 9I:
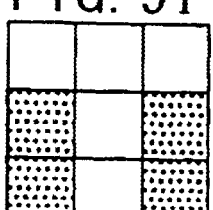
Figure 9J:
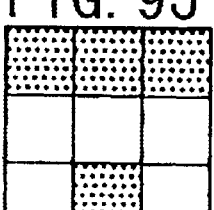

In this manner, a pattern of relative signal levels of pixel groups in the surrounding region is compared with previously provided patterns and a determination is made as to whether a match occurs or not (step 32-5); and, if a match occurs, a configuration corresponding to the matched, previously provided pattern is determined as the image configuration of the surrounding region (step 32-6). If matched with a plurality of previously provided patterns, the two patterns of the configurations as shown in FIGS. 9I, 9J, for example, are both detected as corresponding to the same combination of the nine pattern types. In such case, one pattern of the two patterns with which level difference between the pixels to be selected as the interpolating pixels is smaller is selected as the image configuration of the surrounding region (step 32-7). Since the case of patterns of FIGS. 9I, 9J is determined as vertical/horizontal line, a determination as a horizontal line or horizontal edge is made when the difference in pixel signal level between those above and below the fault pixel is greater than the difference in pixel signal level between those on the left and right sides thereof. Conversely, when the difference in pixel signal level between those above and below is smaller than the difference in pixel signal level between those on the left and right sides, a determination is made as a vertical line or vertical edge.

Figure 9K:
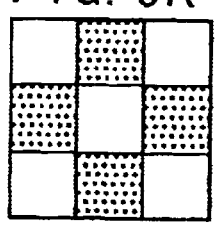

Further, if none of the patterns matches, a previously provided crossing pattern as shown in FIG. 9K, for example, is used as a default pattern which is regarded as the image configuration of the surrounding region (step 32-8).

Figure 10:
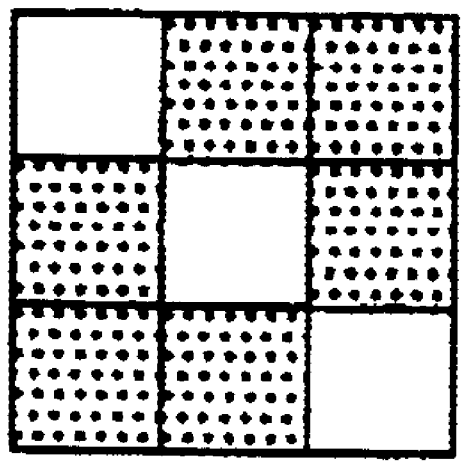
FIG. 10 shows an example of image configuration pattern of the surrounding region where detection of a direction is impossible.

However, when an image configuration as shown in FIG. 10, for example is detected in the above described detection processing system of image configuration of the surrounding region, a problem occurs that it is impossible to uniquely determine which of those rightwardly descending pixels (white) and those rightwardly ascending pixels (black) should be used as the interpolating pixels for interpolating the fault pixel.

Figure 11:
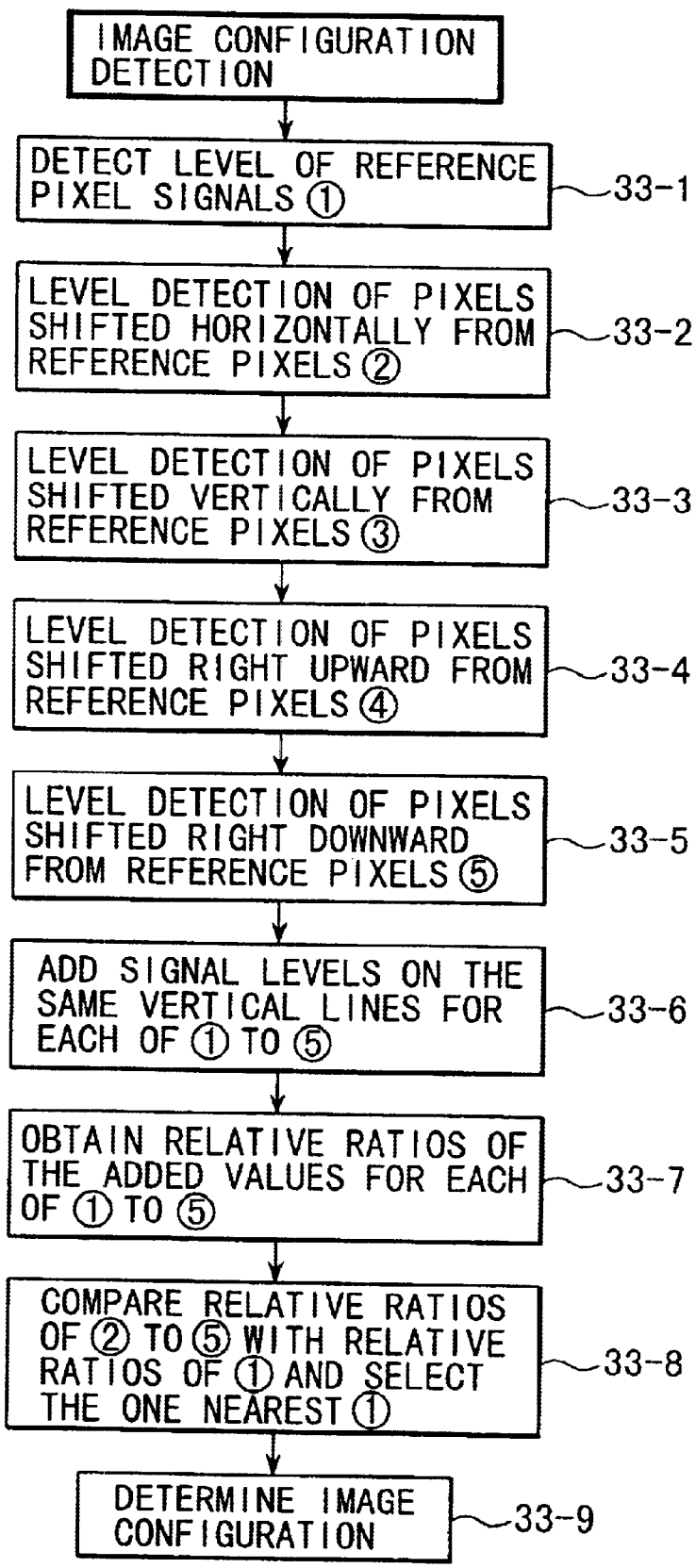
FIG. 11 is a flowchart for explaining a second embodiment of image configuration detection processing.

Such problem is eliminated by a second embodiment of the image configuration detection system which will be described below by way of a flowchart in FIG. 11. First, signal levels of a plurality of pixels surrounding a fault pixel are obtained and these are regarded as reference pixel signal level (step 33-1). For example, as shown in FIG. 12A, supposing a fault pixel indicated by the thick frame as $P_{33}$ the eight pixels $P_{11}$, $P_{13}$, $P_{15}$, $P_{31}$, $P_{35}$, $P_{51}$, $P_{53}$, $P_{55}$, surrounding this fault pixel each with one intervening pixel are determined as reference pixels and their signal levels P11, P13, P15, P31, P35, P51, P53, P55, are obtained.

Next, signal levels are obtained of a first plurality of pixels located at positions uniformly shifted in the horizontal direction respectively from the above reference pixels without overlapping the fault pixel $P_{33}$, i.e., for instance, P12, P14, P16, P32, P36, P52, P54, P56, of pixels $P_{12}$, $P_{14}$, $P_{16}$, $P_{32}$, $P_{36}$, $P_{52}$, $P_{54}$, $P_{56}$, in the example shown in FIG. 12B (step 33-2). In a similar manner, then, signal levels are obtained of a second plurality of pixels located at positions uniformly shifted in the vertical direction respectively from the above reference pixels without overlapping the fault pixel $P_{33}$, i.e., for instance, P21, P23, P25 P41, P45, P61. P63, P65, of pixels $P_{21}$, $P_{23}$, $P_{25}$, $P_{41}$, $P_{45}$, $P_{61}$, $P_{63}$, $P_{65}$, in the example shown in FIG. 12C (step 33-3). Further, signal levels are similarly obtained of a third plurality of pixels located at positions uniformly-shifted in the rightwardly ascending direction respectively from the above reference pixels without overlapping the fault pixel $P_{33}$, i.e., for instance, P02, P04, P06, P22, P26, P42 P44, P46, of pixels $P_{02}$, $P_{04}$, $P_{06}$, $P_{22}$, $P_{26}$, $P_{42}$, $P_{44}$, $P_{46}$, in the example shown in FIG. 12D (step 33-4). Furthermore, signal levels are similarly obtained of a fourth plurality of pixels located at positions uniformly shifted in the rightwardly descending direction respectively from the above reference pixels without overlapping the fault pixel $P_{33}$, i.e., for instance, P22, P24, P26, P42, P46, P62, P64, P66, of pixels $P_{22}$, $P_{24}$, $P_{26}$, $P_{42}$, $P_{46}$, $P_{62}$, $P_{64}$, $P_{66}$, in the example shown in FIG. 12E (step 33-5).

Next, of the reference pixels, sums of signal levels $\alpha_0$, $\beta_0$, $\gamma_0$, of the pixel groups respectively on the same vertical lines are obtained (step 33-6). In the example shown in FIG. 12A, they are represented as follows.

$\alpha_0$=P11+P31+P51

$\beta_0$=P13+P53

$\gamma_0$=P15+P35+P55

Further, of the first plurality of pixels, the sums of signal levels $\alpha_1$, $\beta_2$, $\gamma_2$, of the pixel groups respectively on the same vertical lines are obtained (step 33-6). In the example shown in FIG. 12B, they are represented as follows.

$\alpha_1$=P12+P32+P52

$\beta_1$=P14+P54

$\gamma_1$=P16+P36+P56

Further, of the second plurality of pixels, the sums of signal levels a $\alpha_2$, $\beta_2$, $\gamma_2$, of the pixel groups respectively on the same vertical lines are obtained (step 33-6). In the example shown in FIG. 12C, they are represented as follows.

$\alpha_2$=P21+P41+P61

$\beta_2$=P23+P63

$\gamma_2$=P25+P45+P65

Further, of the third plurality of pixels, the sums of signal levels $\alpha_3$, $\beta_3$, $\gamma_3$, of the pixel groups respectively on the same vertical lines are obtained (step 33-6). In the example shown in FIG. 12D, they are represented as follows.

$\alpha_3$=P02+P22+P42

$\beta_3$=P04+P44

$\gamma_3$=P06+P26+P46

Further, of the fourth plurality of pixels, the sums of signal levels a $\alpha_4$, $\beta_4$, $\gamma_4$, of the pixel groups respectively on the same vertical lines are obtained (step 33-6). In the example shown in FIG. 12E, they are represented as follows.

$\alpha_4$=P22+P42+P62

$\beta_4$=P24+P64

$\gamma_4$=P26+P46+P66

Next, of the reference pixels, the ratios are obtained of a signal level sum, a o for example, of pixel group on a predetermined vertical line to the signal level sum, $\beta_0$, $\gamma_0$, of those pixel groups on all the other vertical lines, i.e., $\alpha_0/\beta_0$, $\alpha_0/\gamma_0$. In a similar manner, of the first plurality of pixels, the ratios are obtained of a signal level sum, $\alpha_1$ for example, of pixel group on a predetermined vertical line to the signal level sums, $\beta_1$, $\gamma_1$, of those pixel groups on all the other vertical lines, i.e., $\alpha_1/\beta_1$, $\alpha_1/\gamma_1$; the ratios are obtained of a signal level sum, $\alpha_2$ for example, of pixel group on a predetermined vertical line of the second plurality of pixels to the signal level sums, $\beta_2$, $\gamma_2$, of those pixel groups on all the other vertical lines, i.e., $\alpha_2/\beta_2$, $\alpha_2/\gamma_2$; the ratios are obtained of a signal level sum, $\alpha_3$ for example, of pixel group on a predetermined vertical line of the third plurality of pixels to the signal level sums, $\beta_3$, $\gamma_3$, of those pixel groups on all the other vertical lines, i.e., $\alpha_3/\beta_3$, $\alpha_3/\gamma_3$; and the ratios are obtained of a signal level sum, $\alpha_4$ for example, of pixel group on a predetermined vertical line of the fourth plurality of pixels to the signal level sums, $\beta_4$, $\gamma_4$, of those pixel groups on all the other vertical lines, i.e., $\alpha_4/\beta_4$, $\alpha_4/\gamma_4$ (step 33-7).

The ratios of the signal level sums a $\alpha_0/\beta_0$, $\alpha_0/\gamma_0$ of the reference pixels ate then compared with ratios of the signal level sums, $\alpha_1/\beta_1$, $\alpha_1/\gamma_1$, $\alpha_2/\beta_2$, $\alpha_2/\gamma_2$, $\alpha_3/\beta_3$, $\alpha_3/\gamma_3$, $\alpha_4/\beta_4$, $\alpha_4/\gamma_4$, of the first to fourth plurality of pixels to select the ratios of signal level sums nearest in value to the ratios of signal level sums of the reference signals (step 33-8). In the above comparison and selection of the ratios of signal level sums: when the ratios of signal level sums concerning the first plurality of pixels are selected, the image configuration of the surrounding region of the fault pixel is determined as a horizontal edge or line; when the ratios of signal level sums concerning the second plurality of pixels are selected, the image configuration of the surrounding region of the fault pixel is determined as a vertical edge or line; when the ratios of signal level sums concerning the third plurality of pixels are selected, the image configuration of the surrounding region of the fault pixel is determined as a rightwardly ascending edge or line; and, when the ratios of signal level sums concerning the fourth plurality of pixels are selected, the image configuration of the surrounding region of the fault pixel is determined as a rightwardly descending edge or line (step 33-9).

After thus detecting an image configuration in the surrounding region in the above described manner, the fault pixel is compensated by means of an interpolation with the interpolating pixels selected on the basis of the detected image configuration. In the example shown in FIGS. 12A to 12E, when the determination is made as a horizontal edge or line, the fault pixel $P_{33}$ is interpolated by a signal level of (P31+P35)/2. When the image configuration is determined as a vertical edge or line, the fault pixel $P_{33}$ is interpolated by a signal level of (P13+P53)/2; when the image configuration is determined as a rightwardly ascending edge or line, the fault pixel $P_{33}$ is interpolated by a signal level of (P15+P51)/2; and, when the image configuration is determined as a rightwardly descending edge or line, the fault pixel $P_{33}$ is interpolated by a signal level of (P11+P55)/2.

In the case of detecting the image configuration in a surrounding region by the foregoing first embodiment, there has been a problem that, though a slanting image form can be detected, it is in some cases impossible to detect the direction of slant, i.e., a descent toward the right or ascent toward the right. In accordance with the present embodiment, however, the direction of slant can be detected, though the region for detection is somewhat increased in size.

A third embodiment of the system for detecting image configuration in a region surrounding the fault pixel will be described below by way of a flowchart in FIG. 13. This embodiment is a combination of the first embodiment shown in the flowchart of FIG. 6 and the second embodiment shown in the flowchart of FIG. 11. In particular, as shown in step 41-1 to step 41-8, a pattern of relative signal levels of a pixel group in the surrounding region is compared with previously provided patterns so as to determine whether any match occurs or not. If a match occurs, the configuration corresponding to the matched, previously provided pattern is temporarily decided as the image configuration of the surrounding region. Further, if a plurality of matches occur, the pattern with which the difference-in level between the pixels to be selected as the interpolating pixels is smaller is temporarily decided as the image configuration. Further, if no matches of patterns occurs, a previously provided default pattern is temporarily decided as the image configuration. For the above steps 41-1 to 41-8, the image configuration detection processing is effected through the steps identical to those in the first embodiment shown in FIG. 6, and, then, it is determined whether or not such temporarily decided image configuration is a slanting edge or line (step 41-9). If, then, the temporarily decided image configuration is not a slanting edge or line, the temporarily decided image configuration is decided as the image configuration of the surrounding region of the fault pixel (step 41-10). If the temporarily decided image configuration is a slanting edge or line, the image configuration detection processing according to the second embodiment shown in FIG., 11 is performed (step 41-11), to decide the image configuration as that including the slanting direction.

By using the image configuration detection processing system according to the third embodiment, an image configuration of surrounding region of the fault pixel can be efficiently detected even when a slanting edge or line is included.

Figure 14:
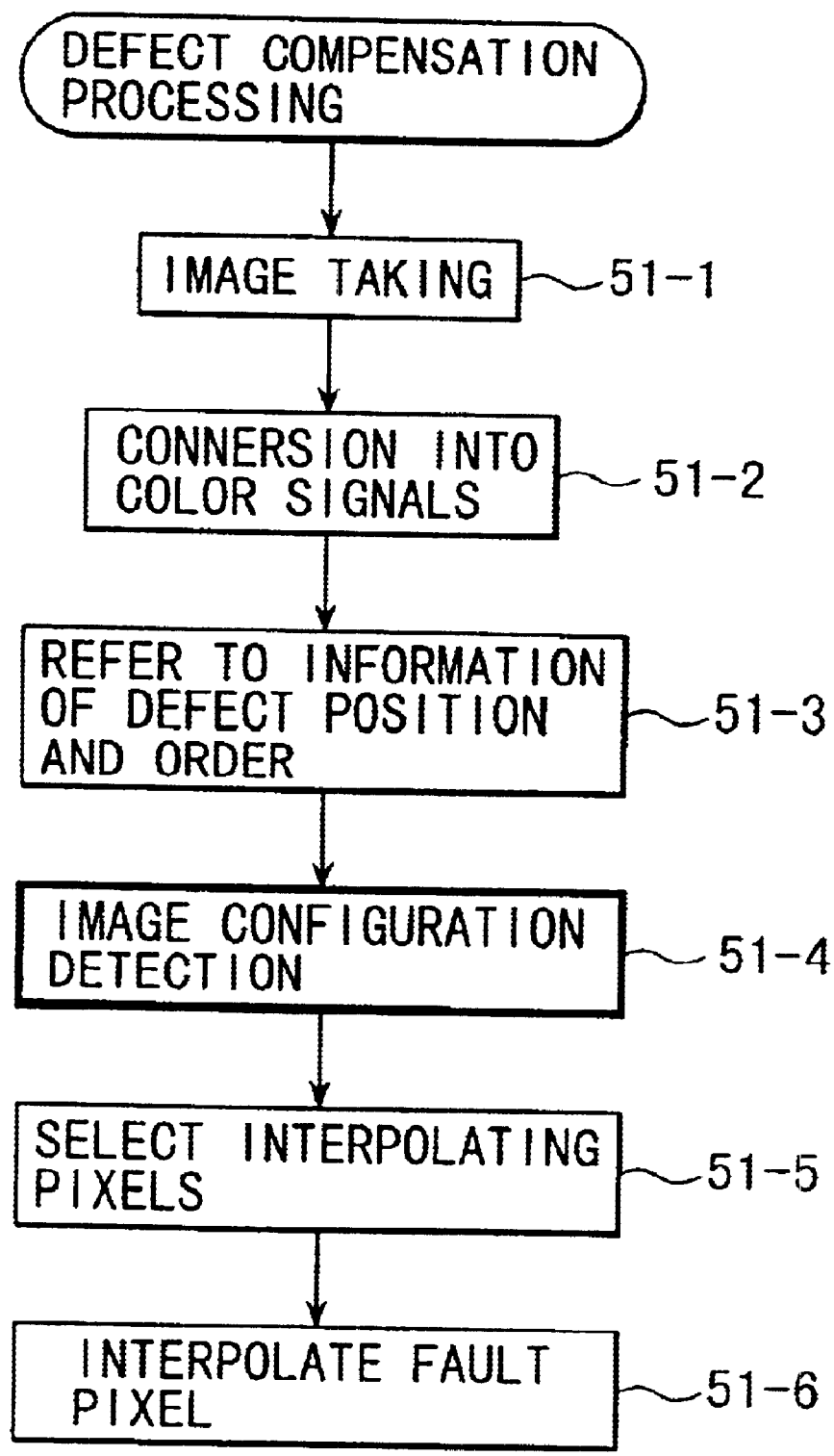
FIG. 14 is a flowchart for explaining the manner of compensation processing of a fault pixel with respect to a color image.

A description will now be given with respect to a system for compensating fault pixels in color image pickup apparatus. The compensation processing of fault pixels in a color image, in principle, is the same as the foregoing defect compensation processing of a black-and-white image. In particular, as shown in a flowchart of FIG. 14: an object image is captured by a color image pickup device such as a single-plate color image pickup device through an image taking operation (step 51-1); and the image pickup signal is converted into color signals of at least three different kinds (step 51-2). Next, information on the positions of fault pixels in the color signals and, if the fault pixels are two-dimensionally consecutive, their order of arrangement is detected and stored and the stored defect information is read out (step 51-3); and an image configuration of the same color as a fault pixel in a region surrounding the fault pixel position is detected on the basis of the information of pixels of the same color as the fault pixel surrounding the fault pixel in the color signals (step 51-4). Next, based on the detected image configuration, interpolating pixels of the same color as the fault pixel are selected from the surrounding region of the fault pixel (step 51-5) and a defect compensation is performed by interpolating the fault pixel by an average level between the interpolating pixels (step 51-6).

The image configuration detection step 51-4 in this defect compensation processing of color image will now be described in detail as a fourth embodiment by way of a flow chart in FIG. 15. First, signal levels are detected of a plurality of pixels of the same color as a fault pixel surrounding the fault pixel (step 52-1). In the color image of Bayer's array of FIG. 16, for example, signal levels are detected of the eight "R" pixels (pixels of the letter in blank) of the same color as the fault pixel surrounding the fault pixel of "R" color encircled at the center. Thereafter, processing steps 52-2 to 52-8 equivalent to those in the image detection processing in a black-and-white image shown in FIG. 6 are performed to detect an image configuration of the same color as the fault pixel in the surrounding region of the fault pixel.

Another technique for detecting an image configuration of the surrounding region of a fault pixel in a color image will now be described as a fifth embodiment by way of a flowchart in FIG. 17. This embodiment corresponds to the detection processing of image configuration in black-and-white image shown in the flowchart of FIG. 11 (second embodiment). First, signal levels are obtained of a plurality of pixels of the same color as a fault pixel surrounding the fault pixel and these are regarded as reference pixel signal levels (step 53-1). For example, supposing $G_{43}$ as the fault pixel as shown in FIG. 18, the eight pixels $G_{21}$, $G_{23}$, $G_{25}$, $G_{41}$, $G_{45}$, $G_{61}$, $G_{63}$, $G_{65}$, of the same color as that in the surrounding, each separated by one intervening pixel therefrom are determined as the reference pixels in respect of the fault pixel $G_{43}$ and their signal levels G21, G23, G25, G41, G45, G61, G63, G65, are obtained.

Next, signal levels are obtained of a first plurality of pixels all of the same color located-at positions uniformly shifted in the horizontal direction respectively from these reference pixels without overlapping the fault pixel $G_{43}$, i.e., for instance, R22, R24, R26, R42, R46, R62, R64, R66, of pixels $R_{22}$, $R_{24}$, $R_{26}$, $R_{42}$, $R_{46}$, $R_{62}$, $R_{64}$, $R_{66}$, in the example shown in FIG. 19 (step 53-2). In a similar manner, then, signal levels are obtained of a second plurality of pixels all of the same color located at positions uniformly shifted in the vertical direction respectively from the reference pixels without overlapping the fault pixel $G_{43}$, i.e., for instance, B31, B33, B35, B51, B55, B71, B73, B75, of pixels $B_{31}$, $B_{33}$, $B_{35}$, $B_{51}$, $B_{55}$, $B_{71}$, $B_{73}$, $B_{75}$, in the example shown in FIG. 20 (step 53-3). Further, signal levels are similarly obtained of a third plurality of pixels all of the same color located at positions uniformly shifted in a rightwardly ascending direction respectively from the reference pixels without overlapping the fault pixel $G_{43}$, i.e., for instance, G12, G14, G16, G32, G36, G52, G54, G56, of pixels $G_{12}$, $G_{14}$, $G_{16}$, $G_{32}$, $G_{36}$, $G_{52}$, $G_{54}$, $G_{56}$, in the example shown in FIG. 21 (step 53-4). Furthermore, signal levels are similarly obtained of a fourth plurality of pixels all of the same color located at positions uniformly shifted in a rightwardly descending direction respectively from the reference pixels without overlapping the fault pixel $G_{43}$, i.e., for instance, G32, G34, G36, G52, G56, G72, G74, G76, of pixels $G_{32}$, $G_{34}$, $G_{36}$, $G_{52}$, $G_{56}$, $G_{72}$, $G_{74}$, $G_{76}$, in the example shown in FIG. 22 (step 53-5).

Next, of the reference pixels, sums of signal levels $\alpha_{00}$, $\beta_{00}$, $\gamma_{00}$, of the pixel groups respectively on the same vertical lines are obtained (step 53-6). In the example shown in FIG. 18, they are represented as follows.

$\alpha_{00}$=G21+G41+G61

$\beta_{00}$=G23+G63

$\gamma_{00}$=G25+G45+G65

Further, of the first plurality of pixels, the sums of signal levels $\alpha_{11}$, $\beta_{11}$, $\gamma_{11}$, of the pixel groups respectively on the same vertical lines are obtained (step 53-6). In the example shown in FIG. 19, they are represented as follows.

$\alpha_{11}$=R22+R42+R62

$\beta_{11}$=R24+R64

$\gamma_{11}$=R26+R46+R66

Further, of the second plurality of pixels, the sums of signal levels a $\alpha_{22}$, $\beta_{22}$, $\gamma_{22}$, of the pixel groups respectively on the same vertical lines are obtained (step 53-6). In the example shown in FIG. 20, they are represented as follows.

$\alpha_{22}$=B31+B51+B71

$\beta_{22}$=B33+B73

$\gamma_{22}$=B35+B55+B75

Further, of the third plurality of pixels, the sums of signal levels a $\alpha_{33}$, $\beta_{33}$, $\gamma_{33}$, of the pixel groups respectively on the same vertical lines are obtained (step 53-6). In the example shown in FIG. 21, they are represented as follows.

$\alpha_{33}$=G12+G32+G52

$\beta_{33}$=G14+G54

$\gamma_{33}$=G16+G36+G56

Further, of the fourth plurality of pixels, the sums of signal levels a $\alpha_{44}$, $\beta_{44}$, $\gamma_{44}$, of the pixel groups respectively on the same vertical lines are obtained (step 53-6). In the example shown in FIG. 22, they are represented as follows.

$\alpha_{44}$=G32+G52+G72

$\beta_{44}$=G34+G74

$\gamma_{44}$=G36+G56+G76

Next, of the reference pixels, the ratios are obtained of a signal level sum, $\alpha_{00}$ for example, of pixel group on a predetermined vertical line to the signal level sums, $\beta_{00}$, $\gamma_{00}$, of those pixel groups on all the other vertical lines, i.e., $\alpha_{00}/\beta_{00}$, $\alpha_{00}/\gamma_{00}$. In a similar manner, of the first plurality of pixels, the ratios are obtained of a signal level sum, $\alpha_{11}$ for example, of pixel group on a predetermined vertical line to the signal level sums, $\beta_{11}$, $\gamma_{11}$, of those pixel groups on all the other vertical lines, i.e., $\alpha_{11}/\beta_{11}$, $\alpha_{11}/\gamma_{11}$. Further, the ratios are obtained of a signal level sum, $\alpha_{22}$ for example, of pixel group on a predetermined vertical line of the second plurality of pixels to the signal level sums, $\beta_{22}$, $\gamma_{22}$, of those pixel groups on all the other vertical lines, i.e., $\alpha_{22}/\beta_{22}$, $\alpha_{22}/\gamma_{22}$. Further, the ratios are obtained of a signal level sum, $\alpha_{33}$ for example, of pixel group on a predetermined vertical line of the third plurality of pixels to the signal level sums, $\beta_{33}$, $\gamma_{33}$, of those pixel groups on all the other vertical lines, i.e., $\alpha_{33}/\beta_{33}$, $\alpha_{33}/\gamma_{33}$. Furthermore, the ratios are obtained of a signal level sum, $\alpha_{44}$ for example, of pixel group on a predetermined vertical line of the fourth plurality of pixels to the signal level sums, $\beta_{44}$, $\gamma_{44}$, of those pixel groups on all the other vertical lines, i.e., $\alpha_{44}/\beta_{44}$, $\alpha_{44}/\gamma_{44}$ (step 53-7).

Next, the ratios of the signal level sums of the reference pixels $\alpha_{00}/\beta_{00}$, $\alpha_{00}/\gamma_{00}$, are compared with ratios of the signal level sums, $\alpha_{11}/\beta_{11}$, $\alpha_{11}/\gamma_{11}$, $\alpha_{22}/\beta_{22}$, $\alpha_{22}/\gamma_{22}$, $\alpha_{33}/\beta_{33}$, $\alpha_{33}/\gamma_{33}$ $\alpha_{44}/\beta_{44}$, $\alpha_{44}/\gamma_{44}$, of the first to fourth plurality of pixels to select the ratios of signal level sums nearest in value to the ratios of signal level sums of the reference signals (step 53-8). Then, in the above comparison and selection of the ratios of signal level sums: when the ratios of signal level sums concerning the first plurality of pixels are selected, the image configuration of the surrounding region of the fault pixel is determined as a horizontal edge or line; and, when the ratios of signal level sums concerning the second plurality of pixels are selected, the image configuration of the surrounding region of the fault pixel is determined as a vertical edge or line. Further, when the ratios of signal level sums concerning the third plurality of pixels are selected, the image configuration of the surrounding region of the fault pixel is determined as a rightwardly ascending edge or line; and, when the ratios of signal level sums concerning the fourth plurality of pixels are selected, the image configuration of the surrounding region of the fault pixel is determined as a rightwardly descending edge or line (step 53-9).

After thus detecting an image configuration in the surrounding region in the above described manner, the fault pixel is compensated by means of an interpolation with the interpolating pixels selected on the basis of the detected image configuration. When a determination is made as a horizontal edge or line, the fault pixel $G_{43}$ is interpolated by a signal level of $(G41+G45)/2$. Further, when the image configuration is determined as a vertical edge or line, the fault pixel $G_{43}$ is interpolated by a signal level of $G43=(G23+G63)/2$; when the image configuration is determined as a rightwardly ascending edge or line, the fault pixel $G_{43}$ is interpolated by a signal level of $G43=(G25+G61)/2$; and, when the image configuration is determined as a rightwardly descending edge or line, the fault pixel $G_{43}$ is interpolated by a signal level of $G43=(G21+G65)/2$.

Figure 13:
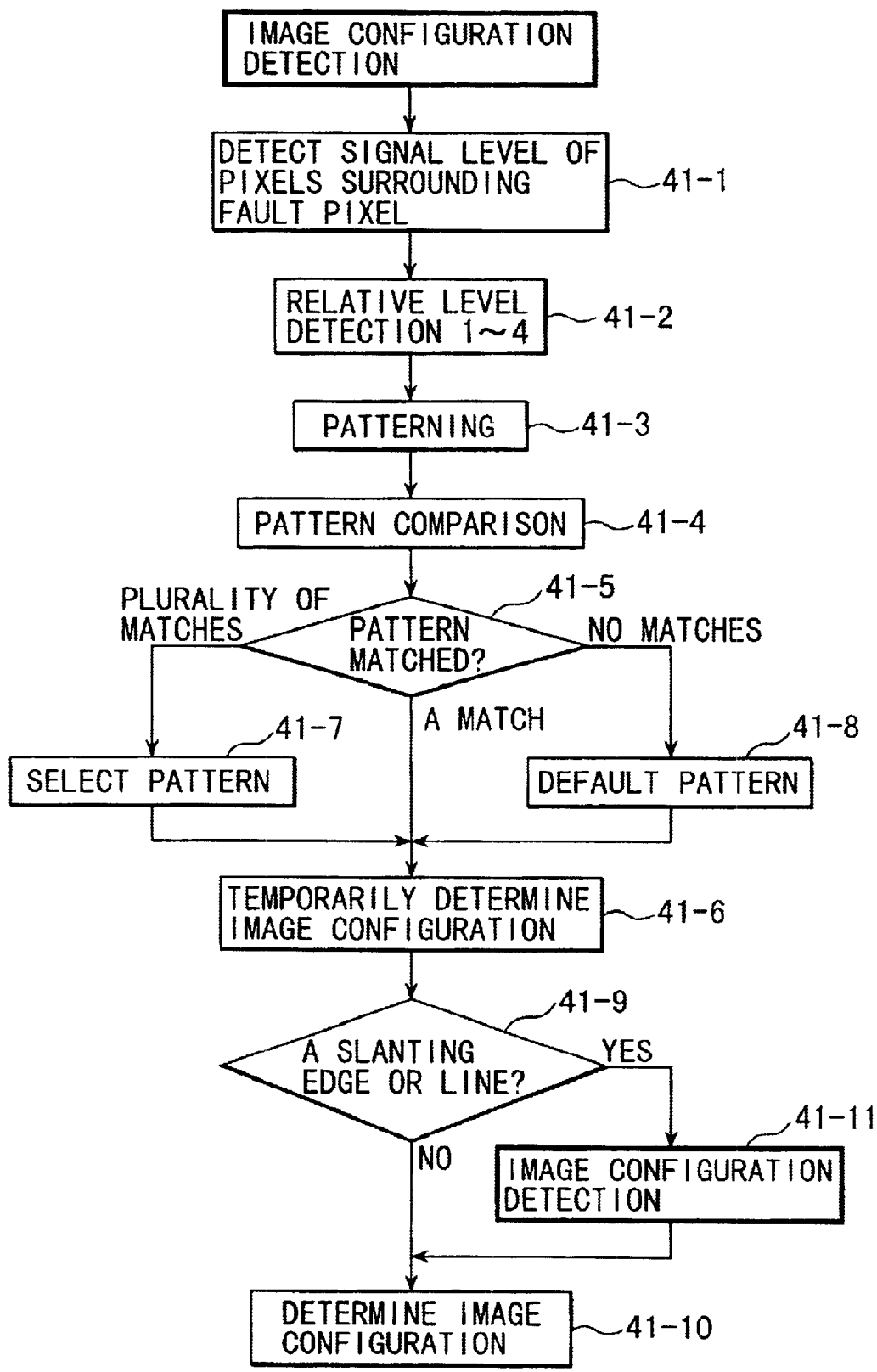
FIG. 13 is a flowchart for explaining a third embodiment of image configuration detection processing.
Figure 15:
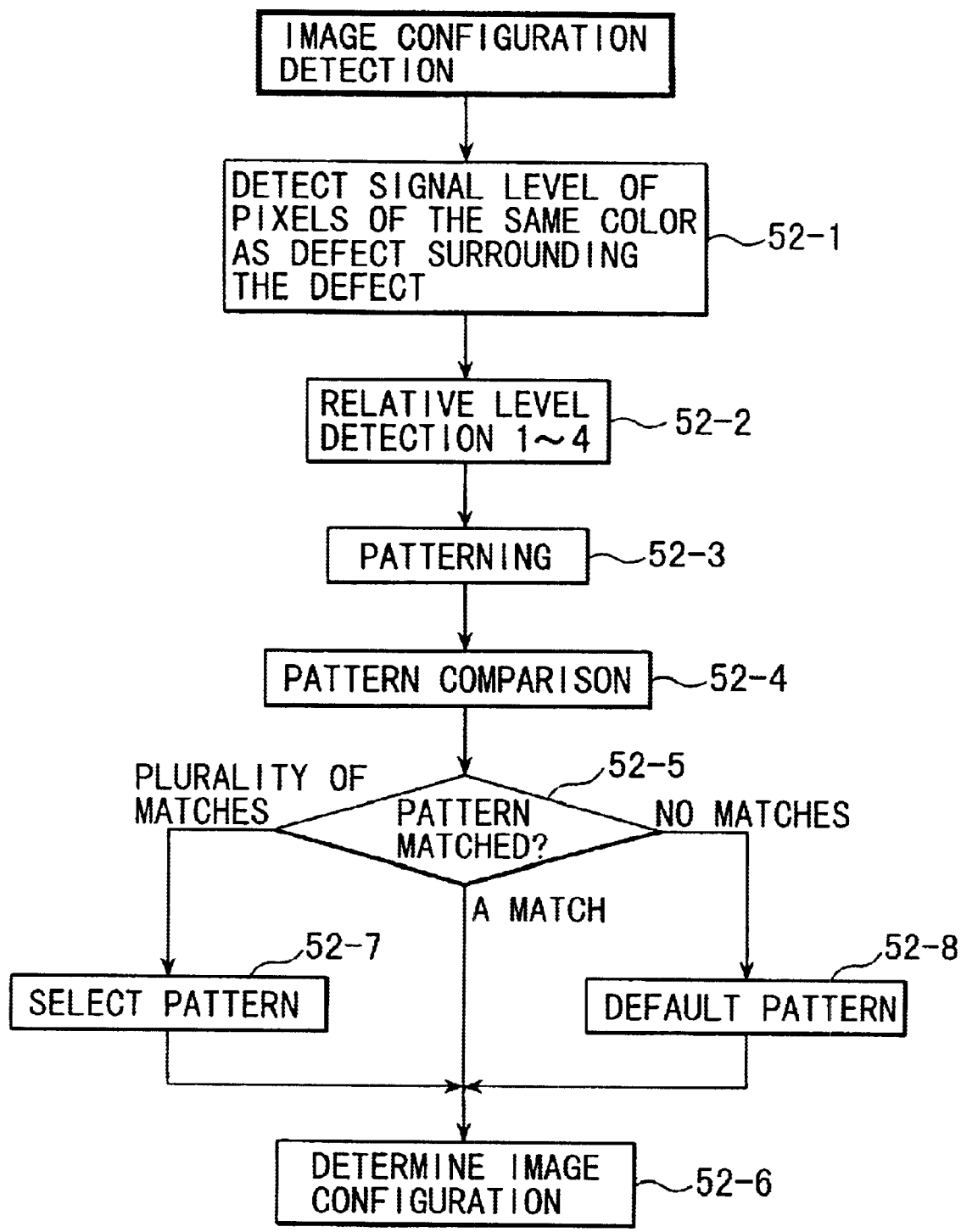
FIG. 15 is a flowchart for explaining in detail as a fourth embodiment the detection processing of image configuration in the flowchart shown in FIG. 14.
Figure 16:
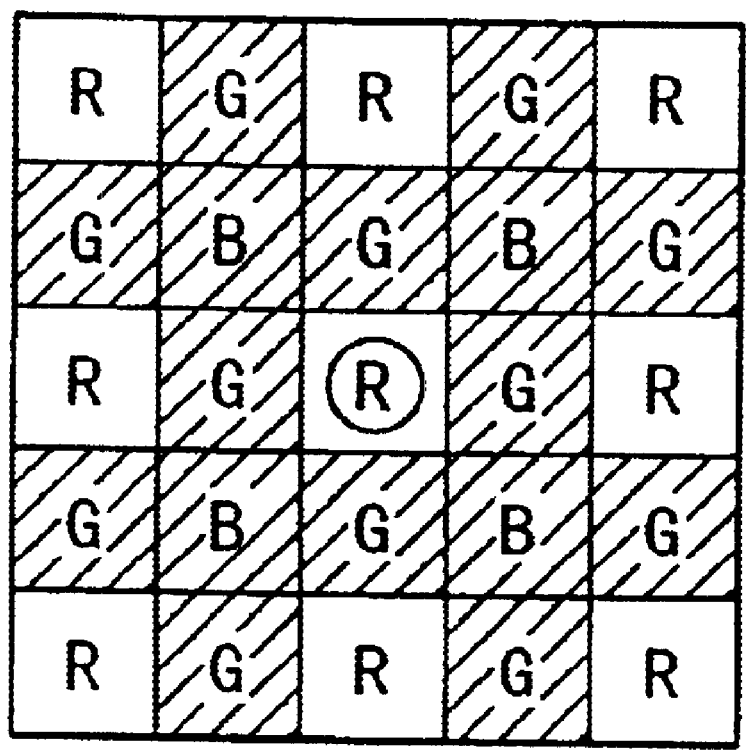
FIG. 16 shows the manner of arrangement of a fault pixel and surrounding pixels of which signal levels are detected in a color image of Bayer's array.
Figure 17:
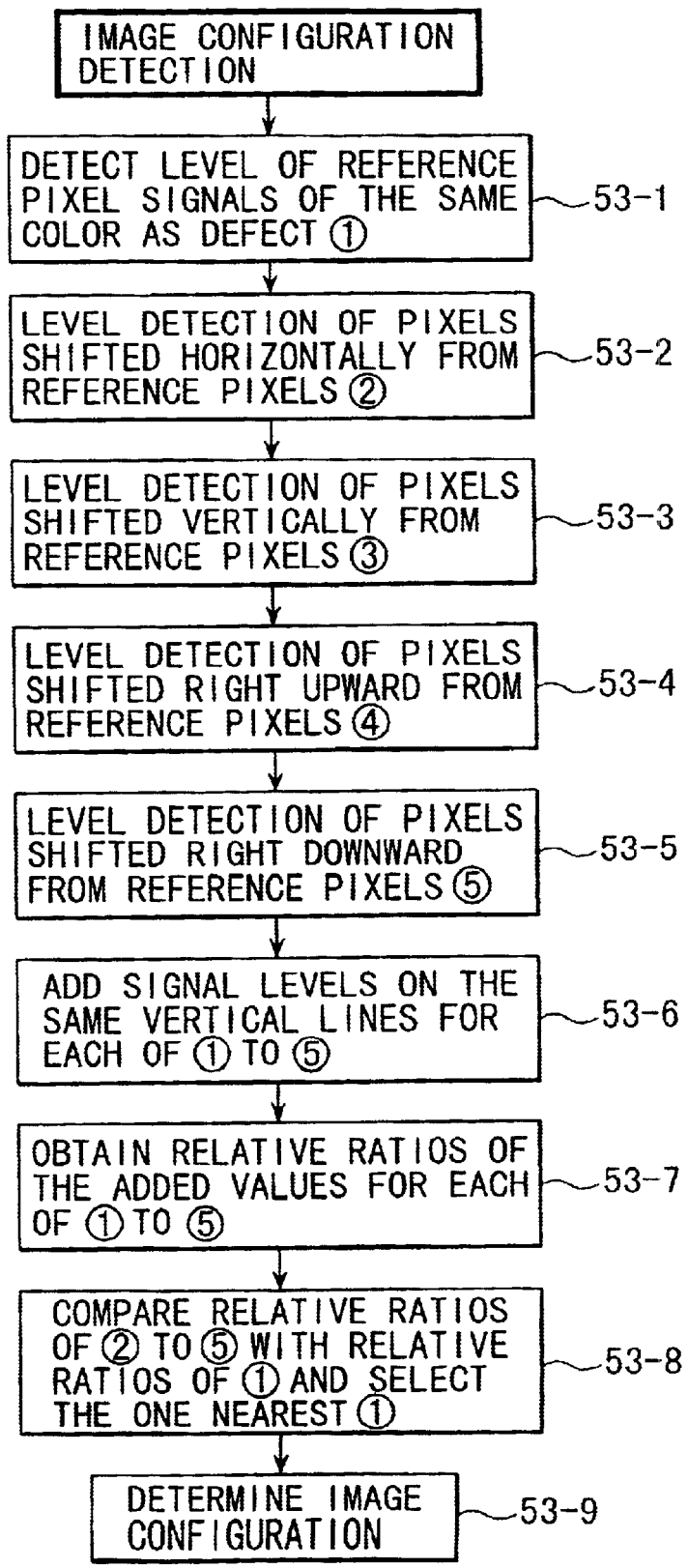
FIG. 17 is a flowchart for explaining as a fifth embodiment another mode of detection processing of image configuration in a color image.

Similarly to the detection processing of image configuration of the surrounding region of the fault pixel concerning a black-and-white image as shown in the flowchart of FIG. 13, it is also possible in the case of a color image to use the processing system where a first image configuration detection is performed by pattern comparison in respect of relative signal levels as shown in FIG. 15 and, when a slanting line or edge is obtained as the image configuration, a second image configuration detection is performed based on the shifting technique of the reference pixels as shown in FIG. 17.

Figure 23:
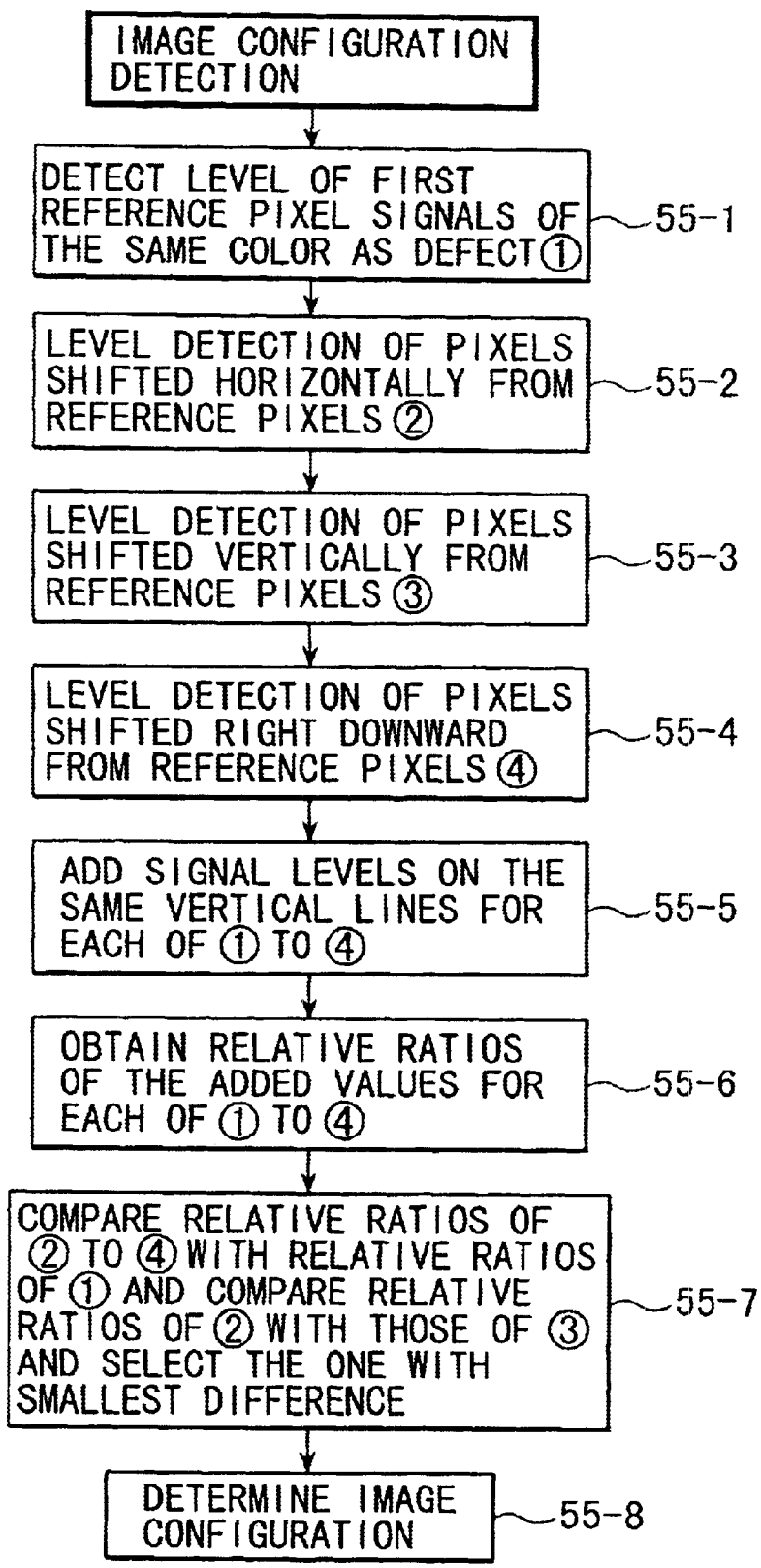
FIG. 23 is a flowchart for explaining as a sixth embodiment yet another mode of detection processing of image configuration in a color image.

Furthermore, since, in a color image (Bayer's array), pixels of the same color are placed at every other locations, four pixels can be treated as one fault pixel and the pixels in such region can be uniformly compensated. A technique for detecting image configuration in the surrounding region of fault pixels in color image in such case will be described below as a sixth embodiment by way of a flowchart in FIG. 23. In this embodiment, too, signal levels are first obtained of a plurality of pixels of the same color as a fault pixel surrounding the fault pixels and these are regarded as reference pixel signal levels (step 55-1). For example, as shown in FIG. 24, it is supposed that a fault pixel group is formed by $G_{43}$, $R_{44}$, $B_{53}$, $G_{54}$, that are bounded by a black frame. In the case of thus considering the four pixels bounded by the black frame as a fault pixel, the eight pixels, $G_{21}$, $G_{23}$, $G_{25}$, $G_{41}$, $G_{45}$, $G_{61}$, $G_{63}$, $G_{65}$, each separated by one intervening pixel in the surrounding from and of the same color as pixel $G_{43}$ among these are regarded as the reference pixels and their signal levels G21, G23, G25, G41, G45, G61, G63, G65, are obtained.

Next, signal levels are obtained of a first plurality of pixels all of the same color located at positions uniformly shifted in the horizontal direction respectively from these reference pixels without overlapping the fault pixel group, i.e., for instance, R22, R24, R26, R42, R46, R62, R64, R66, of pixels $R_{22}$, $R_{24}$, $R_{26}$, $R_{42}$, $R_{46}$, $R_{62}$, $R_{64}$, $R_{66}$, in the example shown in FIG. 25 (step 55-2). In a similar manner, then, signal levels are obtained of a second plurality of pixels all of the same color located at positions uniformly shifted in the vertical direction respectively from the reference pixels without overlapping the fault pixel group, i.e., for instance, B31, B33, B35, B51, B55, B71, B73, B75, of pixels $B_{31}$, $B_{33}$, $B_{35}$, $B_{51}$, $B_{55}$, $B_{71}$, $B_{73}$, $B_{75}$, in the example shown in FIG. 26 (step 55-3). Further, signal levels are similarly obtained of a third plurality of pixels all of the same color located at positions uniformly shifted in the rightwardly descending direction respectively from the reference pixels without overlapping the fault pixel group, i.e., for instance, G32, G34, G36, G52, G56, G72, G74, G76, of pixels $G_{32}$, $G_{34}$, $G_{36}$, $G_{52}$, $G_{56}$, $G_{72}$, $G_{74}$, $G_{76}$, in the example shown in FIG. 27 (step 55-4).

Next, of the reference pixels, sums of signal levels $\alpha_{00}'$, $\beta_{00}'$, $\gamma_{00}'$, of the pixel groups respectively on the same vertical lines are obtained (step 55-5). In the example shown in FIG. 24, they are represented as follows.

$\alpha_{00}'=G21+G41+G61$ $\beta_{00}'=G23+G63$ $\gamma_{00}'=G25+G45+G65$

Further, of the first plurality of pixels, the sums of signal levels a $\alpha_{11}'$, $\beta_{11}'$, $\gamma_{11}'$, of the pixel groups respectively on the same vertical lines are obtained (step 55-5). In the example shown in FIG. 25, they are represented as follows.

$\alpha_{11}'+R42+R62$ $\beta_{11}'=R24+R64$ $\gamma_{11}'=R26+R46+R66$

Further, of the second plurality of pixels, the sums of signal levels $\alpha_{22}'$, $\beta_{22}'$, $\gamma_{11}'$, of the pixel groups respectively on the same vertical lines are obtained (step 55-5). In the example shown in FIG. 26, they are represented as follows.

$\alpha_{22}'=B31+B51+B71$ $\beta_{22}'=B33+B73$ $\gamma_{22}'=B35+B55+B75$

Further, of the third plurality of pixels, the sums of signal levels $\alpha_{33}'$, $\beta_{33}'$, $\gamma_{33}'$, of the pixel groups respectively on the same vertical lines are obtained (step 55-5). In the example shown in FIG. 27, they are represented as follows.

$\alpha_{33}'=G32+G52+G72$ $\beta_{33}'=G34+G74$ $\gamma_{33}'=G36+G56+G76$

Next, of the reference pixels, the ratios are obtained of a signal level sum, a Not for example, of pixel group on a predetermined vertical line to the signal level sums, $\alpha_{00}'$, $\gamma_{00}'$, of those pixel groups on all the other vertical lines, i.e., $\alpha_{00}'/\beta_{00}'$, $\alpha_{00}'/\gamma_{22}'$. In a similar manner, of the first plurality of pixels, the ratios are obtained of a signal level sum, $\alpha_{11}'$ for example, of pixel group on a predetermined vertical line to the signal level sums, $\beta_{11}'$, $\gamma_{11}'$, of those pixel groups on all the other vertical lines, i.e., $\alpha_{11}'/\beta_{11}'$, $\alpha_{11}'/\gamma_{11}'$. Further, the ratios are obtained of a signal level sum, $\alpha_{22}'$ for example, of pixel group on a predetermined vertical line of the second plurality of pixels to the signal level sums, $\beta_{22}'$, $\gamma_{22}'$, of those pixel groups on all the other vertical lines, i.e., $\alpha_{22}'/\beta_{22}'$, $\alpha_{22}'/\gamma_{22}'$. Further, the ratios are obtained of a signal level sum, $\alpha_{33}'$ for example, of pixel group on a predetermined vertical line of the third plurality of pixels to the signal level sums, $\alpha_{33}'$, $\gamma_{33}'$, of those pixel groups on all the other vertical lines, i.e., $\alpha_{33}'/\beta_{33}'$, $\alpha_{33}'/\gamma_{22}'$ (step 55-6).

Next, the ratios of the signal level sums of the reference pixels $\alpha_{00}'/\beta_{00}'$, $\alpha_{00}'/\gamma_{00}'$, are compared with the ratios of the signal level sums, $\alpha_{11}'/\beta_{11}'$, $\alpha_{11}'/\gamma_{11}'$, $\alpha_{22}'/\beta_{22}'$, $\alpha_{22}'/\gamma_{22}'$, $\alpha_{33}'/\beta_{33}'$, $\alpha_{33}'/\gamma_{33}'$, of the first to third plurality of pixels and, in addition, the ratios of the signal level sums of the first plurality of pixels are compared with the ratios of the signal level sums of the second plurality of pixels, and those with a smallest difference are selected (step 55-7). Then, in the above comparison and selection of the ratios of signal level sums: when the ratios of signal level sums concerning the first plurality of pixels are selected, the image configuration of the surrounding region of the fault pixels is determined as a horizontal edge or line; and, when the ratios of signal level sums concerning the second plurality of pixels are selected, the image configuration of the surrounding region of the fault pixels is determined as a vertical edge or line. Further, when difference in the ratios of signal level sums concerning the first and second pluralities of pixels is the smallest, the image configuration of the surrounding region of the fault pixels is determined as a rightwardly ascending edge or line; and, when the ratios of signal level sums concerning the third plurality of pixels are selected, the image configuration of the surrounding region of the fault pixels is determined as a rightwardly descending edge or line (step 55-8).

After thus detecting an image configuration in the surrounding region, the fault pixel is compensated by means of an interpolation with the interpolating pixels selected on the basis of the detected image configuration. When decided as a case of horizontal edge or line, the fault pixel $G_{43}$ is interpolated by the signal level of (G41+G45)/2. Since, in the case of color image, it is permissible to identically interpolate the four pixels that are bounded by the black frame, the fault pixel $R_{44}$ is interpolated by the signal level of (R42+R46)/2, fault pixel $B_{53}$ by signal level of (B51+B55)/2, and fault pixel $G_{54}$ by (G52+G56)/2.

Further, when the image configuration is decided as a vertical line or edge, the fault pixels $G_{43}$, $R_{44}$, $B_{53}$, $G_{54}$ are interpolated by the following signal levels $G_{43}$, $R_{44}$, B53, G54.

G43=(G23+G63)/2
R44=(R24+R64)/2
B53=(B33+B73)/2
G54=(G34+G74)/2

Further, when the image configuration is decided as a rightwardly ascending line or edge, the fault pixels $G_{43}$, $R_{44}$, $B_{53}$, $G_{54}$ are interpolated by the following signal levels G43, R44, B53, G54.

G43=(G25+G61)/2
R44=(R26+R62)/2
B53=(B35+B71)/2
G54=(G36+G72)/2

Further, when the image configuration is decided as a rightwardly descending line or edge, the fault pixels $G_{43}$, $R_{44}$, $B_{53}$, $G_{54}$ are interpolated by the following signal levels G43, R44, B53, G54.

G43=(G21+G65)/2
R44=(R22+R66)/2
B53=(B31+B75)/2
G54=(G32+G76)/2

In the above described embodiments, the fault pixel compensation processing according to the present invention is directly applied to the image pickup signal obtained at the image pickup means. However, it is also possible that the image pickup signal obtained by the image pickup means be compressed and recorded at a recording medium such as a memory by performing a high-speed, simple defect compensation processing such as the conventional four-point interpolation method and that it be subjected to the defect compensation processing according to the present invention at the time of its reproduction (expansion). By performing such defect compensation processing, the processing time at recording can be shortened and, nevertheless, an image compensated for defect at high accuracy can be obtained at the time of reproduction.

As has been described by way of the above embodiments, since, in accordance with the first aspect of the present invention, an image configuration of a surrounding region of fault pixels is detected and, on the basis of such image configuration, the fault pixels are interpolated and compensated, it is possible to compensate the fault pixels at high accuracy even when the defect occurs in a region where a steep change in luminance occurs. In accordance with the second aspect, the defect compensation processing can be performed at high accuracy using a fault pixel information storage means having a relatively small memory capacity. In accordance with the third to sixth aspects, an image configuration of a region surrounding fault pixels can be detected at high accuracy and the fault pixels can be accurately compensated. In accordance with the seventh aspect, an image configuration can be detected at high accuracy as that including the direction of slant without increasing the region for detecting the image configuration. In accordance with the eighth aspect, an image configuration of a region surrounding fault pixels can be efficiently detected irrespective of the presence of a slanting image form. In accordance with the ninth aspect, even when the direction of an image configuration of the surrounding region is erroneously detected, a compensation is possible so as to make the pixel defect less conspicuous.

Further, in accordance with the tenth aspect of the invention, even when a pixel defect occurs in region where luminance of color image steeply changes, it can be compensated at high accuracy. In accordance with the eleventh aspect, a pixel defect compensation processing of a color image can be performed at high accuracy using a fault pixel information storage means having a relatively small memory capacity. In accordance with the twelfth to fifteenth aspects, an image configuration of a region surrounding fault pixels can be detected at high accuracy in a color image and the fault pixels can be accurately compensated. In accordance with the sixteenth aspect, an image configuration in a region surrounding fault pixels in a color image can be detected at high accuracy as that including the direction of slant without increasing the region for detecting the image configuration. In accordance with the seventeenth aspect, an image configuration of a region surrounding fault pixels in a color image can be efficiently detected irrespective of the presence of a slanting image form. In accordance with the eighteenth aspect, even when the direction of an image configuration of the surrounding region is erroneously detected, a compensation is possible so as to make the pixel defect less conspicuous in a color image. In according with the nineteenth aspect, since the image pickup signal is compressed and recorded to the recording medium after compensated for defects, it is possible to prevent a defect from occurring at the time of compressing and recording the picked up image. In accordance with the twentieth aspect, since a high-speed, simple defect compensation is performed at the time of recording and a highly accurate defect compensation is performed at the time of reproduction, the time for recording of picked up image can be reduced and an output image can be obtained as compensated for defect pixels at high accuracy.

What is claimed is:

1. An image pickup apparatus comprising:
   image pickup means having a semiconductor image pickup device composed of two-dimensionally arrayed pixels, for converting object light into image signals;
   fault pixel detection means for obtaining the position of fault pixels in said semiconductor image pickup device and, if the fault pixels are two-dimensionally consecutive, additionally obtaining a pattern of order of the fault pixels;

fault pixel information storage means for storing information concerning the fault pixels obtained at the fault pixel detection means;

surrounding image configuration detection means for detecting from information of pixels surrounding the fault pixels an image configuration of a region surrounding a fault pixel location obtained by said fault pixel detection means in the image signals obtained from said image pickup means without depending on configuration of the fault pixels;

pixel defect compensation means for selecting pixels from a surrounding of the fault pixels based on the image configuration detected by the surrounding image configuration detection means and performing pixel defect compensation by interpolating the fault pixels using the selected pixels;

signal level detection means for obtaining respective signal levels of a plurality of pixels surrounding a fault pixel;

first relative level detection means for, of signal level data of the plurality of pixels obtained from the signal level detection means, placing those of a plurality of pixels located above the fault pixel together into a horizontally oriented group, the signal level of one pixel in the group used as a reference pixel signal level to obtain relative signal levels of the other pixels with respect to the reference pixel signal level;

second relative level detection means for, of signal level data of the plurality of pixels obtained from the signal level detection means, placing those of a plurality of pixels located below the fault pixel together into a horizontally oriented group, the signal level of one pixel in the group used as a reference pixel signal level to obtain relative signal levels of the other pixels with respect to the reference pixel signal level;

third relative level detection means for, of signal level data of the plurality of pixels obtained from the signal level detection means, placing those of a plurality of pixels located on the right side of the fault pixel together into a vertically oriented group, the signal level of one pixel in the group used as a reference pixel signal level to obtain relative signal levels of the other pixels with respect to the reference pixel signal level;

fourth relative level detection means for, of signal level data of the plurality of pixels obtained from the signal level detection means, placing those of a plurality of pixels located on the left side of the fault pixel together into a vertically oriented group, the signal level of one pixel in the group used as a reference pixel signal level to obtain relative signal levels of the other pixels with respect to the reference pixel signal level;

pattern means for representing the relative signal level data obtained at said first to fourth relative level detection means in connection with pixel locations to pattern the pixel signal levels within each group;

comparison means for comparing the patterns obtained at the pattern means with previously set patterns;

first image configuration determination means for, in case that the patterns obtained at said pattern means are matched by the set pattern in the comparing operation at said comparison means, determining the matching set pattern as a surrounding image configuration;

second image configuration determination means for, in case that the patterns obtained at said pattern means are matched by none of the set patterns in the comparing operation at said comparison means, determining a previously set specific pattern as a surrounding image configuration; and third image configuration determination means for, in case that the patterns obtained at said pattern means are matched by plural ones of the previously set patterns in the comparing operation at said comparison means, selecting from the plurality of matching set patterns one pattern having a smallest signal level difference among a plurality of interpolation pixels indicated by such set patterns to determine it as a surrounding image configuration.

2. An image pickup apparatus comprising:

image pickup means having a semiconductor image pickup device composed of two-dimensionally arrayed pixels, for converting object light into image signals;

fault pixel detection means for obtaining the position of fault pixels in said semiconductor image pickup device and, if the fault pixels are two-dimensionally consecutive, additionally obtaining a pattern of order of the fault pixels;

fault pixel information storage means for storing information concerning the fault pixels obtained at the fault pixel detection means;

surrounding image configuration detection means for detecting from information of pixels surrounding the fault pixels an image configuration of a region surrounding a fault pixel location obtained by said fault pixel detection means in the image signals obtained from said image pickup means without depending on configuration of the fault pixels;

pixel defect compensation means for selecting pixels from a surrounding of the fault pixels based on the image configuration detected by the surrounding image configuration detection means and performing pixel defect compensation by interpolating the fault pixels using the selected pixels, wherein said fault pixel information storage means, when fault pixels are two-dimensionally consecutive, stores the pixel location of one of the consecutive fault pixels and a pattern of order of the other fault pixels;

signal level detection means for obtaining respective signal levels of a plurality of pixels surrounding a fault pixel;

first relative level detection means for, of signal level data of the plurality of pixels obtained from the signal level detection means, placing those of a plurality of pixels located above the fault pixel together into a horizontally oriented group, the signal level of one pixel in the group used as a reference pixel signal level to obtain relative signal levels of the other pixels with respect to the reference pixel signal level;

second relative level detection means for, of signal level data of the plurality of pixels obtained from the signal level detection means, placing those of a plurality of pixels located below the fault pixel together into a horizontally oriented group, the signal level of one pixel in the group used as a reference pixel signal level to obtain relative signal levels of the other pixels with respect to the reference pixel signal level;

third relative level detection means for, of signal level data of the plurality of pixels obtained from the signal level detection means, placing those of a plurality of pixels located on the right side of the fault pixel together into a vertically oriented group, the signal level of one pixel in the group used as a reference pixel signal level to obtain relative signal levels of the other pixels with respect to the reference pixel signal level;

fourth relative level detection means for, of signal level data of the plurality of pixels obtained from the signal level detection means, placing those of a plurality of pixels located on the left side of the fault pixel together into a vertically oriented group, the signal level of one pixel in the group used as a reference pixel signal level to obtain relative signal levels of the other pixels with respect to the reference pixel signal level;

pattern means for representing the relative signal level data obtained at said first to fourth relative level detection means in connection with pixel locations to pattern the pixel signal levels within each group;

comparison means for comparing the patterns obtained at the pattern means with previously set patterns;

first image configuration determination means for, in case that the patterns obtained at said pattern means are matched by the set pattern in the comparing operation at said comparison means, determining the matching set pattern as a surrounding image configuration;

second image configuration determination means for, in case that the patterns obtained at said pattern means are matched by none of the set patterns in the comparing operation at said comparison means, determining a previously set specific pattern as a surrounding image configuration; and third image configuration determination means for, in case that the patterns obtained at said pattern means are matched by plural ones of the previously set patterns in the comparing operation at said comparison means, selecting from the plurality of matching set patterns one pattern having a smallest signal level difference among a plurality of interpolation pixels indicated by such set patterns to determine it as a surrounding image configuration.

3. An image pickup apparatus comprising:

image pickup means having a semiconductor image pickup device composed of two-dimensionally arrayed pixels, for converting object light into image signals;

fault pixel detection means for obtaining the position of fault pixels in said semiconductor image pickup device and, if the fault pixels are two-dimensionally consecutive, additionally obtaining a pattern of order of the fault pixels;

fault pixel information storage means for storing information concerning the fault pixels obtained at the fault pixel detection means;

surrounding image configuration detection means for detecting from information of pixels surrounding the fault pixels an image configuration of a region surrounding a fault pixel location obtained by said fault pixel detection means in the image signals obtained from said image pickup means without depending on configuration of the fault pixels;

pixel defect compensation means for selecting pixels from a surrounding of the fault pixels based on the image configuration detected by the surrounding image configuration detection means and performing pixel defect compensation by interpolating the fault pixels using the selected pixels;

reference pixel signal level detection means for determining as reference pixels a plurality of pixels surrounding a fault pixel and for obtaining the signal levels of the reference pixels;

first signal level detection means for detecting the signal levels of a first plurality of pixels respectively at locations uniformly shifted in the horizontal direction from said reference pixels without overlapping said fault pixel;

second signal level detection means for detecting the signal levels of a second plurality of pixels respectively at locations uniformly shifted in the vertical direction from said reference pixels without overlapping said fault pixel;

third signal level detection means for detecting the signal levels of a third plurality of pixels respectively at locations uniformly shifted toward the upper right from said reference pixels without overlapping said fault pixel;

fourth signal level detection means for detecting the signal levels of a fourth plurality of pixels respectively at locations uniformly shifted toward the lower right from said reference pixels without overlapping said fault pixel;

means for obtaining for each vertical line sum of signal levels of the pixels of said reference pixels on the same vertical line;

means for obtaining for each vertical line sum of signal levels of the pixels of said first plurality of pixels located on the same vertical line;

means for obtaining for each vertical line sum of signal levels of the pixels of said second plurality of pixels located on the same vertical line;

means for obtaining for each vertical line sum of signal levels of the pixels of said third plurality of pixels located on the same vertical line;

means for obtaining for each vertical line sum of signal levels of the pixels of said fourth plurality of pixels located on the same vertical line;

means for, of said reference pixels, obtaining ratios with respect to the signal level sum of the pixels on a predetermined vertical line of the signal level sums of the pixels on all the other vertical lines;

means for, of said first plurality of pixels, obtaining ratios with respect to the signal level sum of the pixels on a predetermined vertical line of the signal level sums of the pixels on all the other vertical lines;

means for, of said second plurality of pixels, obtaining ratios with respect to the signal level sum of the pixels on a predetermined vertical line of the signal level sums of the pixels on all the other vertical lines;

means for, of said third plurality of pixels, obtaining ratios with respect to the signal level sum of the pixels on a predetermined vertical line of the signal level sums of the pixels on all the other vertical lines;

means for, of said fourth plurality of pixels, obtaining ratios with respect to the signal level sum of the pixels on a predetermined vertical line of the signal level sums of the pixels on all the other vertical lines;

means for comparing the ratios of the signal level sums of said reference pixels with the ratios of the signal level sums, respectively, of the first, second, third and fourth to select the ratios of the signal level-sums closest in value to the ratios of the signal level sums of the reference pixels; and means for determining an image configuration of the surrounding region as a horizontally oriented edge or line when the ratios of the signal level sums of the first plurality of pixels, are selected by the means for selecting, determining an image configuration of the surrounding region as a vertically oriented edge or line when the ratios of the signal level sums of the second plurality of pixels are selected, determining an image configuration of the surrounding region as a rightwardly ascending edge or line when the ratios of the signal level sums of the third plurality of pixels are selected, or determining an image configuration of the surrounding region as a rightwardly descending edge or line when the ratios of the signal level sums of the fourth plurality of pixels are selected.

4. An image pickup apparatus comprising:

image pickup means having a semiconductor image pickup device composed of two-dimensionally arrayed pixels, for converting object light into image signals;

fault pixel detection means for obtaining the position of fault pixels in said semiconductor image pickup device and, if the fault pixels are two-dimensionally consecutive, additionally obtaining a pattern of order of the fault pixels;

fault pixel information storage means for storing information concerning the fault pixels obtained at the fault pixel detection means;

surrounding image configuration detection means for detecting from information of pixels surrounding the fault pixels an image configuration of a region surrounding a fault pixel location obtained by said fault pixel detection means in the image signals obtained from said image pickup means without depending on configuration of the fault pixels;

pixel defect compensation means for selecting pixels from a surrounding of the fault pixels based on the image e configuration detected by the surrounding image configuration detection means and performing pixel defect compensation by interpolating the fault pixels using the selected pixels, wherein said surrounding image configuration detection means comprises first surrounding image configuration detection means and second surrounding image configuration detection means, said first surrounding image configuration detection means comprising:

signal level detection means for obtaining respective signal levels of a plurality of pixels surrounding a fault pixel;

first relative level detection means for, of signal level data of the plurality of pixels obtained from the signal level detection means, placing those of a plurality of pixels located above the fault pixel together into a horizontally oriented group, the signal level of one pixel in the group used as a reference pixel signal level to obtain relative signal levels of the other pixels with respect to the reference pixel signal level;

second relative level detection means for, of signal level data of the plurality of pixels obtained from the signal level detection means, placing those of a plurality of pixels located below the fault pixel together into a horizontally oriented group, the signal level of one pixel in the group used as a reference pixel signal level to obtain relative signal levels of the other pixels with respect to the reference pixel signal level;

third relative level detection means for, of signal level data of the plurality of pixels obtained from the signal level detection means, placing those of a plurality of pixels located on the right side of the fault pixel together into a vertically oriented group, the signal level of one pixel in the group used as a reference pixel signal level to obtain relative signal levels of the other pixels with respect to the reference pixel signal level;

fourth relative level detection means for, of signal level data of the plurality of pixels obtained from the signal level detection means, placing those of a plurality of pixels located on the left side of the fault pixel together into a vertically oriented group, the signal level of one pixel in the group used as a reference pixel signal level to obtain relative signal levels of the other pixels with respect to the reference pixel signal level;

pattern means for representing the relative signal level data obtained at said first to fourth relative level detection means in connection with pixel locations to pattern the pixel signal levels within each group;

comparison means for comparing the patterns obtained at the pattern means with previously set patterns;

first image configuration determination means for, in case that the patterns obtained at said pattern means are matched by the set pattern in the comparing operation at said comparison means, determining the matching set pattern as a surrounding image configuration;

second image configuration determination means for, in case that the patterns obtained at said pattern means are matched by none of the set patterns in the comparing operation at said comparison means, determining a previously set specific pattern as a surrounding image configuration; and third image configuration determination means for, in case that the patterns obtained at said pattern means are matched by plural ones of the previously set patterns in the comparing operation at said comparison means, selecting from the plurality of matching set patterns one pattern having a smallest signal level difference among a plurality of interpolation pixels indicated by such set patterns to determine it as a surrounding image configuration; and said second surrounding image configuration detection means comprising:

reference pixel signal level detection means for determining as reference pixels a plurality of pixels surrounding a fault pixel and for obtaining the signal levels of the reference pixels;

first signal level detection means for detecting the signal levels of a first plurality of pixels respectively at locations uniformly shifted in the horizontal direction from said reference pixels without overlapping said fault pixel;

second signal level detection means for detecting the signal levels of a second plurality of pixels respectively at locations uniformly shifted in the vertical direction from said reference pixels without overlapping said fault pixel;

third signal level detection means for detecting the signal levels of a third plurality of pixels respectively at locations uniformly shifted toward the upper right from said reference pixels without overlapping said fault pixel;

fourth signal level detection means for detecting the signal levels of a fourth plurality of pixels respectively at locations uniformly shifted toward the lower right from said reference pixels without overlapping said fault pixel;

means for obtaining for each vertical line sum of signal levels of the pixels of said reference pixels on the same vertical line;

means for obtaining for each vertical line sum of signal levels of the pixels of said first plurality of pixels located on the same vertical line;

means for obtaining for each vertical line sum of signal levels of the pixels of said second plurality of pixels located on the same vertical line;

means for obtaining for each vertical line sum of signal levels of the pixels of said third plurality of pixels located on the same vertical line;

means for obtaining for each vertical line sum of signal levels of the pixels of said fourth plurality of pixels located on the same vertical line;

means for, of said reference pixels, obtaining ratios with respect to the signal level sum of the pixels on a predetermined vertical line of the signal level sums of the pixels on all the other vertical lines;

means for, of said first plurality of pixels, obtaining ratios with respect to the signal level sum of the pixels on a predetermined vertical line of the signal level, sums of the pixels on all the other vertical lines;

means for, of said second plurality of pixels, obtaining ratios with respect to the signal level sum of the pixels on a predetermined vertical line of the signal level sums of the pixels on all the other vertical lines;

means for, of said third plurality of pixels, obtaining ratios with respect to the signal level sum of the pixels on a predetermined vertical line of the signal level sums of the pixels on all the other vertical lines;

means for, of said fourth plurality of pixels, obtaining ratios with respect to the signal level sum of the pixels on a predetermined vertical line of the signal level sums of the pixels on all the other vertical lines;

means for comparing the ratios of the signal level sums of said reference pixels with the ratios of the signal level sums, respectively, of the first, second, third and fourth to select the ratios of the signal level sums closest in value to the ratios of the signal level sums of the reference pixels; and means for determining an image configuration of the surrounding region as a horizontally oriented edge or line when the ratios of the signal level sums of the first plurality of pixels are selected by the means for selecting, determining an image configuration of the surrounding region as a vertically oriented edge or line when the ratios of the signal level sums of the second plurality of pixels are selected, determining an image configuration of the surrounding region as a rightwardly ascending edge or line when the ratios of the signal level sums of the third plurality of pixels are selected, or determining an image configuration of the surrounding region as a rightwardly descending edge or line when the ratios of the signal level sums of the fourth plurality of pixels are selected; and wherein the detection of configuration by the second surrounding image configuration detection means performed only when a slanting line form is detected by said first surrounding image configuration detection means.

* * * * *